US010929345B2

(12) United States Patent
Stoddard et al.

(10) Patent No.: US 10,929,345 B2
(45) Date of Patent: Feb. 23, 2021

(54) SYSTEM AND METHOD OF PERFORMING SIMILARITY SEARCH QUERIES IN A NETWORK

(71) Applicant: Tanium Inc., Emeryville, CA (US)

(72) Inventors: Joshua F. Stoddard, Cary, NC (US); John R. Coates, Berkeley, CA (US); Naveen Goela, Berkeley, CA (US); Aaron J. Tarter, Chapel Hill, NC (US); Christian L. Hunt, Chapel Hill, NC (US)

(73) Assignee: TANIUM INC., Kirkland, WA (US)

( * ) Notice: Subject to any disclaimer, the term of this patent is extended or adjusted under 35 U.S.C. 154(b) by 16 days.

(21) Appl. No.: 16/532,391

(22) Filed: Aug. 5, 2019

(65) Prior Publication Data

US 2019/0361843 A1 Nov. 28, 2019

Related U.S. Application Data

(63) Continuation-in-part of application No. 15/215,474, filed on Jul. 20, 2016, now Pat. No. 10,482,242, and
(Continued)

(51) Int. Cl.
*G06F 16/14* (2019.01)
*G06F 16/182* (2019.01)
*H04L 29/08* (2006.01)

(52) U.S. Cl.
CPC .......... *G06F 16/152* (2019.01); *G06F 16/144* (2019.01); *G06F 16/1834* (2019.01); *H04L 67/104* (2013.01); *H04L 67/1063* (2013.01)

(58) Field of Classification Search
CPC ....... H04L 43/08; H04L 43/00; H04L 43/062; H04L 43/10; H04L 67/2842;
(Continued)

(56) References Cited

U.S. PATENT DOCUMENTS 5,220,596 A 6/1993 Patel
5,842,202 A 11/1998 Kon
(Continued)

FOREIGN PATENT DOCUMENTS

EP 1553747 A1 7/2005
EP 2493118 A1 8/2012

OTHER PUBLICATIONS

Abdalkarim Awad et al., Virtual Cord Protocol (VCP): A Flexible DHT-like Routing Service for Sensor Networks, In Proceedings of the 5th IEEE International Conference on Mobile Ad Hoc and Sensor Systems, 2008, 10 pgs. 133-142.
(Continued)

*Primary Examiner* — Tae K Kim
(74) *Attorney, Agent, or Firm* — Morgan, Lewis & Bockius LLP

(57) ABSTRACT

In a distributed system, each of N machines receives a similarity search query through a linear communication orbit. The similarity search query includes token identifiers corresponding to tokens in a target document. Each machine, in response, identifies files that meet predefined similarity criteria with respect to the target document. Subsequent to receiving the similarity search query, the machine generates a first report, including a count of files stored at the machine that meet the predefined similarity criteria with respect to the target document, and/or information identifying a set of files that meet the predefined similarity criteria with respect to the target document; and sends the first report to a server through the linear communication orbit. The server produces a merged report presenting information with respect to files at a set of machines, including the N machines, that meet the predefined similarity criteria with respect to the target document.

20 Claims, 14 Drawing Sheets

Related U.S. Application Data a continuation-in-part of application No. 15/215,468, filed on Jul. 20, 2016, now Pat. No. 10,372,904.

(60) Provisional application No. 62/333,768, filed on May 9, 2016, provisional application No. 62/305,482, filed on Mar. 8, 2016, provisional application No. 62/868,767, filed on Jun. 28, 2019.

(58) Field of Classification Search
CPC ............... H04L 67/2885; H04L 67/104; H04L 67/1042; H04L 67/1061; H04L 67/1063; H04L 41/0893; H04L 41/0813; H04L 41/0869; H04L 41/12; G06F 16/152; G06F 16/144; G06F 16/1834

See application file for complete search history.

(56) References Cited

U.S. PATENT DOCUMENTS

| | | | |
|---|---|---|---|
| 5,949,755 A | 9/1999 | Uphadya et al. | |
| 6,049,828 A | 4/2000 | Dev et al. | |
| 6,615,213 B1 | 9/2003 | Johnson | |
| 6,879,979 B2 | 4/2005 | Hindawi et al. | |
| 6,885,644 B1 | 4/2005 | Knop et al. | |
| 7,043,550 B2 | 5/2006 | Knop et al. | |
| 7,120,693 B2 | 10/2006 | Chang et al. | |
| 7,240,044 B2 | 7/2007 | Chaudhuri et al. | |
| 7,299,047 B2 | 11/2007 | Dolan et al. | |
| 7,555,545 B2 | 6/2009 | McCasland | |
| 7,600,018 B2 | 10/2009 | Maekawa et al. | |
| 7,698,453 B2 | 4/2010 | Samuels et al. | |
| 7,720,641 B2 | 5/2010 | Alagappan et al. | |
| 7,761,557 B2 | 7/2010 | Fellenstein et al. | |
| 7,769,848 B2 | 8/2010 | Choy et al. | |
| 7,844,687 B1 | 11/2010 | Gelvin et al. | |
| 8,078,668 B2 | 12/2011 | Moreau | |
| 8,139,508 B1 | 3/2012 | Roskind | |
| 8,185,612 B1 | 5/2012 | Arolovitch et al. | |
| 8,185,615 B1 | 5/2012 | McDysan et al. | |
| 8,271,522 B2 | 9/2012 | Mehul et al. | |
| 8,392,530 B1 | 3/2013 | Manapragada et al. | |
| 8,477,660 B2 | 7/2013 | Lee et al. | |
| 8,504,879 B2 | 8/2013 | Poletto et al. | |
| 8,510,562 B2 | 8/2013 | Ramakrishnan et al. | |
| 8,813,228 B2 | 8/2014 | Magee et al. | |
| 8,885,521 B2 | 11/2014 | Wang et al. | |
| 8,903,973 B1* | 12/2014 | Hindawi .................. | H04L 45/16 709/223 |
| 8,904,039 B1* | 12/2014 | Hindawi .............. | H04L 12/6418 709/243 |
| 9,009,827 B1 | 4/2015 | Albertson et al. | |
| 9,059,961 B2* | 6/2015 | Hindawi ............... | H04L 67/104 |
| 9,246,977 B2 | 1/2016 | Hindawi et al. | |
| 9,609,007 B1 | 3/2017 | Rivlin et al. | |
| 9,667,738 B2* | 5/2017 | Hindawi .............. | H04L 67/2842 |
| 9,716,649 B2 | 7/2017 | Bent et al. | |
| 9,769,037 B2* | 9/2017 | Hindawi ............... | H04L 43/065 |
| 9,800,603 B1 | 10/2017 | Sidagni et al. | |
| 9,985,982 B1 | 5/2018 | Bartos et al. | |
| 10,095,864 B2* | 10/2018 | Hunt .................... | H04L 63/1425 |
| 10,136,415 B2 | 11/2018 | Hindawi et al. | |
| 10,498,744 B2* | 12/2019 | Hunt ................... | H04L 12/4625 |
| 2001/0056461 A1 | 12/2001 | Kampe et al. | |
| 2002/0007404 A1 | 1/2002 | Vange et al. | |
| 2002/0042693 A1 | 4/2002 | Kampe et al. | |
| 2002/0073086 A1 | 6/2002 | Thompson et al. | |
| 2002/0198867 A1 | 12/2002 | Lohman et al. | |
| 2003/0101253 A1 | 5/2003 | Saito et al. | |
| 2003/0131044 A1 | 7/2003 | Nagendra et al. | |
| 2003/0212676 A1 | 11/2003 | Bruce et al. | |
| 2003/0212821 A1 | 11/2003 | Gillies et al. | |
| 2004/0076164 A1 | 4/2004 | Vanderveen et al. | |
| 2004/0190085 A1 | 9/2004 | Silverbrook et al. | |
| 2005/0004907 A1 | 1/2005 | Bruno et al. | |
| 2005/0108356 A1 | 5/2005 | Rosu et al. | |
| 2005/0108389 A1 | 5/2005 | Kempin et al. | |
| 2005/0195755 A1* | 9/2005 | Senta .................... | H04L 12/185 370/255 |
| 2006/0039371 A1 | 2/2006 | Castro et al. | |
| 2006/0128406 A1 | 6/2006 | Macartney | |
| 2007/0005738 A1 | 1/2007 | Alexion-Tiernan et al. | |
| 2007/0211651 A1 | 9/2007 | Ahmed et al. | |
| 2007/0230482 A1 | 10/2007 | Shim et al. | |
| 2008/0082628 A1 | 4/2008 | Rowstron et al. | |
| 2008/0133582 A1 | 6/2008 | Andersch et al. | |
| 2008/0258880 A1 | 10/2008 | Smith et al. | |
| 2008/0263031 A1 | 10/2008 | George et al. | |
| 2008/0288646 A1 | 11/2008 | Hasha et al. | |
| 2009/0125639 A1 | 5/2009 | Dam et al. | |
| 2009/0271360 A1 | 10/2009 | Bestgen et al. | |
| 2009/0319503 A1 | 12/2009 | Mehul et al. | |
| 2009/0328115 A1 | 12/2009 | Malik | |
| 2010/0070570 A1 | 3/2010 | Lepeska | |
| 2010/0085948 A1 | 4/2010 | Yu et al. | |
| 2010/0094862 A1 | 4/2010 | Bent et al. | |
| 2010/0296416 A1 | 11/2010 | Lee et al. | |
| 2010/0306252 A1 | 12/2010 | Jarvis et al. | |
| 2011/0231431 A1* | 9/2011 | Kamiwada ............ | G06F 16/335 707/769 |
| 2011/0271319 A1* | 11/2011 | Venable, Sr. ........... | H04L 41/12 726/1 |
| 2012/0269096 A1 | 10/2012 | Roskind | |
| 2013/0110931 A1* | 5/2013 | Kim ..................... | H04N 21/632 709/204 |
| 2013/0170336 A1* | 7/2013 | Chen ....................... | H04L 41/12 370/221 |
| 2013/0276053 A1 | 10/2013 | Hugard, IV et al. | |
| 2014/0075505 A1 | 3/2014 | Subramanian | |
| 2014/0101133 A1 | 4/2014 | Carston et al. | |
| 2014/0149557 A1 | 5/2014 | Lohmar et al. | |
| 2014/0164552 A1 | 6/2014 | Kim et al. | |
| 2014/0181295 A1* | 6/2014 | Hindawi ............. | H04L 67/1048 709/224 |
| 2014/0244727 A1 | 8/2014 | Kang et al. | |
| 2014/0280280 A1 | 9/2014 | Singh | |
| 2014/0375528 A1 | 12/2014 | Ling | |
| 2015/0080039 A1 | 3/2015 | Ling et al. | |
| 2015/0149624 A1* | 5/2015 | Hindawi ............. | H04L 41/0893 709/224 |
| 2015/0163121 A1 | 6/2015 | Mahaffey et al. | |
| 2015/0172228 A1* | 6/2015 | Zalepa ................ | H04L 12/1813 709/206 |
| 2015/0256575 A1 | 9/2015 | Scott | |
| 2015/0372911 A1 | 12/2015 | Yabusaki et al. | |
| 2015/0373043 A1 | 12/2015 | Wang et al. | |
| 2016/0080408 A1 | 3/2016 | Colelman et al. | |
| 2016/0119251 A1 | 4/2016 | Solis et al. | |
| 2016/0269434 A1 | 9/2016 | DiValentin et al. | |
| 2016/0286540 A1 | 9/2016 | Hindawi et al. | |
| 2016/0352588 A1* | 12/2016 | Subbarayan ........... | H04L 69/16 |
| 2016/0360006 A1 | 12/2016 | Hopkins et al. | |
| 2017/0118074 A1 | 4/2017 | Feinstein et al. | |
| 2018/0013768 A1* | 1/2018 | Hunt ..................... | G06F 21/552 |
| 2018/0039486 A1 | 2/2018 | Kulkami et al. | |
| 2018/0074796 A1 | 3/2018 | Alabes et al. | |
| 2018/0191747 A1 | 7/2018 | Nachenberg et al. | |
| 2018/0351792 A1* | 12/2018 | Hunter ............... | H04L 41/0853 |
| 2018/0351793 A1* | 12/2018 | Hunter ............... | H04L 41/0853 |
| 2019/0280867 A1* | 9/2019 | Kurian .................. | H04W 4/70 |
| 2020/0028890 A1* | 1/2020 | White ..................... | H04L 67/10 |
| 2020/0053072 A1 | 2/2020 | Glozman et al. | |

OTHER PUBLICATIONS

Jae Woo Lee et al., 0 to 10k in 20 seconds: Bootstrapping Large-Scale DHT networks, 2011 IEEE International Conference on Communications, Jun. 9, 2011, pp. 1-6.

Hood, Proactive Network-Fault Detection, Sep. 1997, 9 pages.

Mongeau, D., et al., "Ensuring integrity of network inventory and configuration data," Telecommunications Network Strategy and

(56) References Cited

OTHER PUBLICATIONS

Planning Symposium, Networks 2004, 11th International Vienna, Austria, Jun. 13-16, 2004, 6 pgs.

Rao et al., "Optimal Resource Placement in Structured Peer-to-Peer Networks," Jul. 2010, IEEE Transactions on Parallel and Distributed Systems, vol. 21, No. 7, 16 pgs.

Stoica, I., et al., "Chord: A Scalable Peer-to-Peer Lookup Service for Internet Applications," SIGCOMM '01, Aug. 27-31, 2001, San Diego, California, 12 pages.

Tanium Inc, International Search Report and Written Opinion, PCT/US2013/076971, dated Apr. 4, 2014, 19 pgs.

Tanium Inc, International Preliminary Report on Patentability, PCT/US2013/076971, dated Jun. 23, 2015, 14 pgs.

Tanium Inc, International Search Report and Written Opinion, PCT/US2014/067607, dated Feb. 18, 2015, 15 pgs.

Tanium Inc, International Preliminary Report on Patentability, PCT/US2014/067607, dated May 31, 2016, 10 pgs.

Tanium Inc, International Search Report and Written Opinion, PCT/US2015/0020780, dated Jul. 2, 2015, 14 pgs.

Tanium Inc, International Preliminary Report on Patentability, PCT/US2015/0020780, dated Sep. 27, 2016, 9 pgs.

Hindawi, Office Action, U.S. Appl. No. 15/702,617, dated Jun. 1, 2018, 37 pgs.

Hindawi, Final Office Action, U.S. Appl. No. 15/702,617, dated Dec. 27, 2018, 54 pgs.

Hunt, Office Action dated Oct. 4, 2018, U.S. Appl. No. 15/215,468, 13 pgs.

Hunt, Notice of Allowance dated Jan. 24, 2019, U.S. Appl. No. 15/215,468, 8 pgs.

Hunt, Notice of Allowance dated Apr. 1, 2019, U.S. Appl. No. 15/215,468, 8 pgs.

Hunt, Office Action dated Sep. 10, 2018, U.S. Appl. No. 15/215,474, 10 pgs.

Hunt, Final Office Action dated Apr. 1, 2019, U.S. Appl. No. 15/215,474, 7 pgs.

Hunt, Notice of Allowance, U.S. Appl. No. 15/713,518, dated Apr. 10, 2019, 14 pgs.

Lippincott, Notice of Allowance, U.S. Appl. No. 15/878,286, dated Apr. 2, 2019, 9 pgs.

Jae Woo Lee, Henning Schulzrinne, Wolfgang Kellerer and Zoran Despotovic, 0 to 10k in 20 Seconds: Bootstrapping Large-Scale DHT Networks, pp. 1-6, Jun. 9, 2011 (Year: 2011).

Ion Stoica, Robert Morris, David Karger, M. Frans Kaashoek, Hari Balakrishnan, Chord: A Scalable Peertopeer Lookup Service for Internet Applications, 2001, pp. 1-12 (Year: 2002).

Ping Wang, Baber Aslann, Cliff C. Zou, Peer-to-Peer Botnets: The Next Generation of Botnet Attacks, Jan. 2010, pp. 1-25 (Year: 2010).

Sean Rhea, Dennis Geels, Timothy Roscoe, and John Kubiatowicz, Handling Churn in a DHT, 2004, pp. 1-14 (Year: 2004).

\* cited by examiner

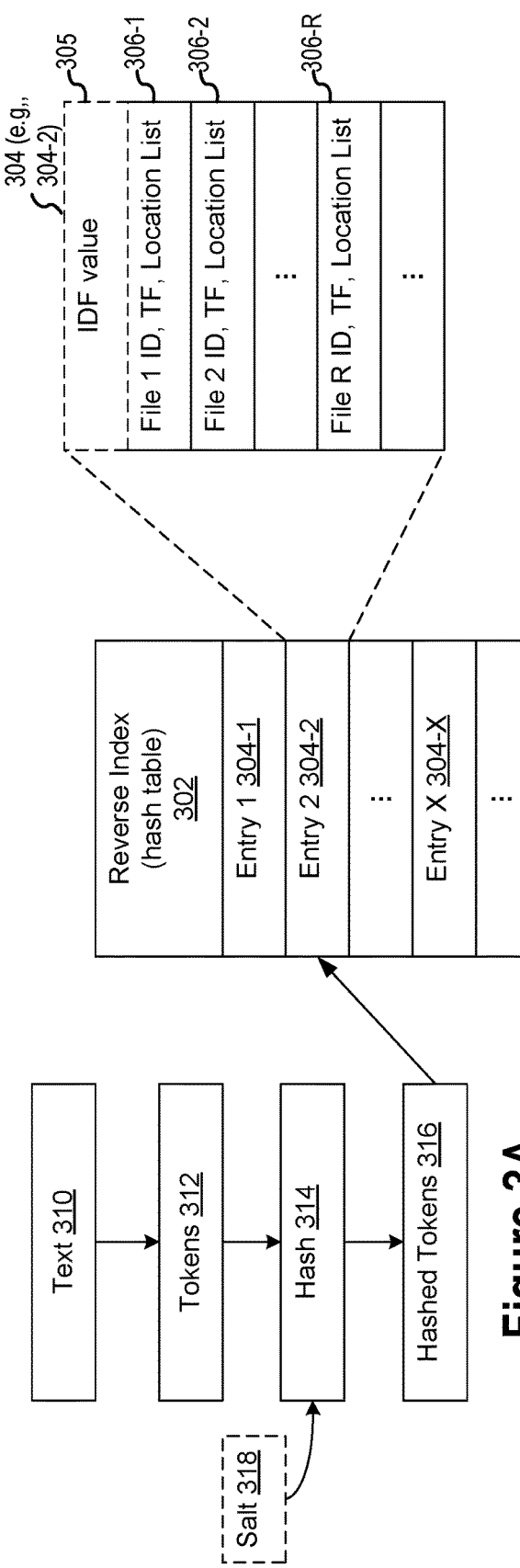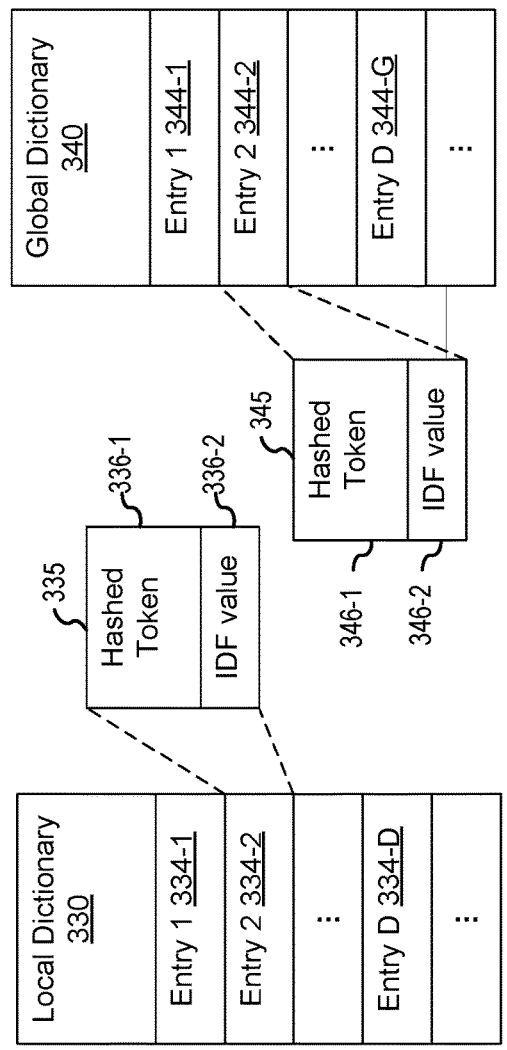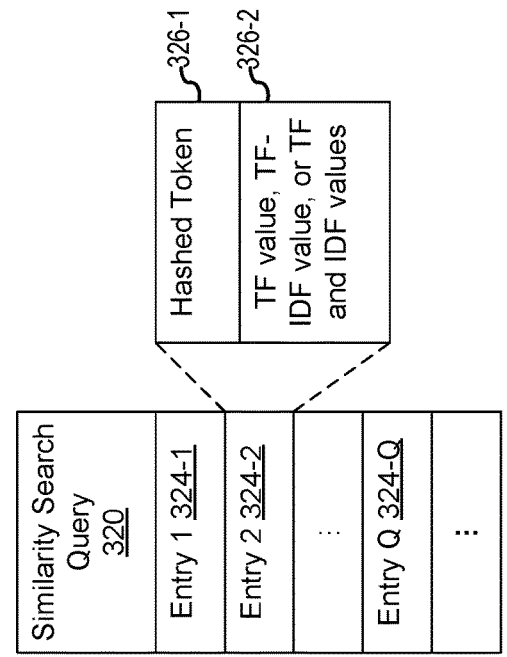

First Report 502

| Machine | Rule | Count of matching files | Total matches | Scan Progress |
|---|---|---|---|---|
| Machine 1 | Rule 1 | 1-10 | 51-100 | Complete |
| Machine 1 | Rule 2 | 11-50 | 101-500 | Complete |
| Machine 2 | Rule 2 | 11-50 | 51-100 | Complete |
| Machine 3 | Rule 1 | 1-10 | 1-50 | Complete |
| Machine 3 | Rule 3 | 1-10 | 51-100 | Complete |
| ⋮ | ⋮ | ⋮ | ⋮ | ⋮ |

Figure 5A

Second Report 520

| File ID | Count of matching file content | File Metadata |
|---|---|---|
| File 1 | 52 | Metadata 1 |
| File 2 | 24 | Metadata 2 |
| File 3 | 14 | Metadata 3 |
| File 4 | 8 | Metadata 4 |
| File 5 | 4 | Metadata 5 |
| ⋮ | ⋮ | ⋮ |

Figure 5B

Third Report 540

| File Snippets | Confirmed |
|---|---|
| SSN 123-45-6789 | Yes |
| 111-22-3434 | |
| 10/012345678 | |
| SSN 098-76-5432 | Yes |
| 181612141 | |
| ⋮ | ⋮ |

Figure 5C

First Report, Quick Search 602

| Machine | Count of matching files | Scan progress |
|---|---|---|
| Machine 1 | 1-10 | Complete |
| Machine 2 | 11-50 | Complete |
| Machine 3 | 11-50 | Complete |
| ⋮ | ⋮ | ⋮ |

Figure 6A

Second Report, Quick Search 620

| File ID | Count of matching file content | File Metadata |
|---|---|---|
| File 1 | 24 | Metadata 1 |
| File 2 | 8 | Metadata 2 |
| File 3 | 14 | Metadata 3 |
| File 4 | 4 | Metadata 4 |
| File 5 | 52 | Metadata 5 |
| ⋮ | ⋮ | ⋮ |

Figure 6B

Third Report, Quick Search 640

| File snippets | Location |
|---|---|
| add or remove app, website, or email accounts... | File ID, line count... |
| all your email, calendar events, and files in one place... | File ID, line count... |
| enter your email and password to access.... | File ID, line count... |
| ⋮ | ⋮ |

Figure 6C

First Report, Similarity Search 650

| Machine | File Counts | | | Scan Progress |
|---|---|---|---|---|
| | >70% | >80% | >90% | |
| 1 | 54 | 4 | 3 | Complete |
| 2 | 160 | 5 | 0 | Complete |
| 3 | 7 | 1 | 0 | Complete |
| ⋮ | ⋮ | ⋮ | ⋮ | |

Figure 6D

Second Report, Similarity Search 660

| File ID | Similarity Score | File Metadata |
|---|---|---|
| File 1 | 0.99 | Metadata 1 |
| File 2 | 0.98 | Metadata 2 |
| File 3 | 0.96 | Metadata 3 |
| File 4 | 0.89 | Metadata 4 |
| File 5 | 0.71 | Metadata 5 |
| ⋮ | ⋮ | ⋮ |

Figure 6E

SYSTEM AND METHOD OF PERFORMING SIMILARITY SEARCH QUERIES IN A NETWORK

PRIORITY CLAIM AND RELATED APPLICATIONS

This application is a continuation-in-part of U.S. application Ser. No. 15/215,474, filed Jul. 20, 2016, titled "System and Method for Performing Event Inquiries in a Network," which claims the benefit of U.S. Provisional Application Ser. No. 62/333,768, filed May 9, 2016, titled "System and Method for Performing Event Inquiries in a Network;" and U.S. Provisional Patent Application Ser. No. 62/305,482, filed Mar. 8, 2016, titled "Cost Prioritized Evaluations of Indicators of Compromise." This application is also a continuation-in-part of U.S. application Ser. No. 15/215,468, filed Jul. 20, 2016, titled "Cost Prioritized Evaluations of Indicators of Compromise," which claims the benefit of U.S. Provisional Application Ser. No. 62/333,768, filed May 9, 2016, titled "System and Method for Performing Event Inquiries in a Network;" and U.S. Provisional Application Ser. No. 62/305,482, filed Mar. 8, 2016, titled "Cost Prioritized Evaluations of Indicators of Compromise." The content of each of the above-mentioned applications is hereby incorporated by reference in its entirety. This application also claims priority to U.S. Provisional Application Ser. No. 62/868,767, filed Jun. 28, 2019.

This application is also related to U.S. patent application Ser. No. 13/797,946, filed Mar. 12, 2013, now U.S. Pat. No. 9,246,977, titled "System, Security and Network Management Using Self-Organizing Communication Orbits in Distributed Networks;" U.S. patent application Ser. No. 12/412,623, filed Mar. 27, 2009, now U.S. Pat. No. 8,086,729, titled "Distributed Statistical Detection of Network Problems and Causes;" U.S. patent application Ser. No. 13/084,923, filed Apr. 12, 2011, now U.S. Pat. No. 8,904,039, titled "Large-Scale Network Querying and Reporting;" U.S. patent application Ser. No. 13/107,625, filed May 13, 2011, now U.S. Pat. No. 8,903,973, titled "Parallel Distributed Network Management;" U.S. patent application Ser. No. 14/553,769, filed Nov. 25, 2014, now U.S. Pat. No. 9,769,037, titled "Fast Detection and Remediation of Unmanaged Assets;" U.S. patent application Ser. No. 14/554,739, filed Nov. 26, 2014, now U.S. Pat. No. 9,769,275, titled "Data Caching and Distribution in a Local Network;" and U.S. patent application Ser. No. 15/136,790, filed Apr. 22, 2016, now U.S. Pat. No. 9,910,752, titled "Reliable Map-Reduce Communications in a Decentralized, Self-Organizing Communication Orbit of a Distributed Network." Content of each of the above applications is hereby incorporated by reference in its entirety. The above applications are also referred to hereafter as "the Related Applications" or "the Incorporated Disclosure.".

TECHNICAL FIELD

The present disclosure relates to secure search and management of computers in computer networks.

BACKGROUND

Network administrators (e.g., administrators of enterprise-level networks, such as banking networks, e-Commerce networks, etc.) often hire third-party cybersecurity companies to monitor and respond to threats. Thus, those responding to security incidents are often located remotely from the network rather than within it. Nevertheless, when a possible threat is detected, security incident responders need to be able to perform forensic investigations on machines within the network, e.g., by inquiring into events at the machines. But because network machines are often isolated from (e.g., remote from) the servers used by security incident responders (e.g., isolated by a firewall), it is difficult for these remote servers to communicate directly with machines within the network. Network administrators simply do not want to allow direct communication of remote computers with machines within their networks if the channels of communication cannot be trusted.

Further, once a file of interest has been identified at one of the many machines in a distributed system having many computers and computer-controlled devices, it is sometimes desirable to locate and identify other files throughout the distributed system that are similar, but not necessarily identical, to the file of interest. However, traditional methodologies for finding files in a distributed system typically rely on a centralized database or the like, located at one or more central servers, that stores an index of information concerning all files stored throughout the system, which imposes a significant burden in terms of requiring servers dedicated to storing and update the index and in terms of network bandwidth for crawling and re-crawling the entire network to locate new and updated files throughout the distributed system and to build and update the index.

SUMMARY (A1) Accordingly, there is a need for quickly finding, throughout a distributed system, files similar to a specified target file. To that end, a method is provided for sending a similarity search query to a collection of machines, such as the machines connected to the nodes of one or more linear communication orbits. The method is performed at each of N respective machines in the collection of machines that are nodes in the linear communication orbit, where N is an integer greater than 2 (e.g., an integer greater than 5, 10, 15 or 20). At each such machine, the method includes receiving a similarity search query through the linear communication orbit, where the similarity search query has been propagated from a respective server to the respective machine though one or more upstream machines (e.g., upstream of the respective machine) along the linear communication orbit, and where the similarity search query includes token identifiers corresponding to tokens in a target document. The target document is a document for which similar documents are being searched. Each of the N respective machines receives the same similarity search query. In response to receiving the similarity search query, each machine identifies files stored at the respective machine that meet predefined similarity criteria with respect to the target document, and for each identified file generates a similarity score.

Subsequent to receiving the similarity search query, each machine generates a first report that includes a count of files stored at the respective machine that meet the predefined similarity criteria with respect to the target document identifying information for a set of files that meet the predefined similarity criteria with respect to the target document, and sends the first report through the linear communication orbit to the respective server via an end machine of the linear communication orbit. The files that meet the predefined similarity criteria include files having content that is not identical to content of the target document.

The method further includes, at the respective server, receiving from each of the N respective machines a respective first report, including a count of files at the respective machine that meet the predefined similarity criteria with respect to the target document identifying information for a set of files that meet the predefined similarity criteria with respect to the target document. The respective server produces a merged report presenting information with respect to files at a set of machines, including the N respective machines, that meet the predefined similarity criteria with respect to the target document.

(A2) In some embodiments, the method of A1 includes, at a respective machine of the N respective machines: after sending the first report, receiving, from an external machine, external to the linear communication orbit, an instruction packet via the linear communication orbit, where the instruction packet has been propagated to the respective machine through the one or more upstream machines along the linear communication orbit. The instruction packet includes an instruction for establishing a direct duplex connection between the respective machine and the external machine. In response to receiving the instruction packet through the linear communication orbit, the respective machine sends an outbound connection request to the external machine to establish the direct duplex connection between the respective machine and the external machine in accordance with a respective network connection protocol. Furthermore, after establishing the direct duplex connection, the respective machine sends to the external machine, via the direct duplex connection, a second report with additional information, not included in the first report, with respect to one or more of the files identified as meeting the predefined similarity criteria with respect to the target document.

(A3) In some embodiments, the method of A2 includes, at the respective machine of the N respective machines: receiving a second query through the direct duplex connection from the external machine, wherein the second query includes one or more requests for snippets of information from a respective file, stored at the respective machine, identified as meeting the predefined similarity criteria with respect to the target document. Further, the method of A2 includes, in response to receiving the second query, sending to the external machine via the duplex direct connection a third report including one or more snippets corresponding to file content in the respective file that includes text corresponding to one or more tokens specified by the second query.

(A4) Optionally, in the method of any of A1-A3, the similarity search query includes a set of token identifiers identifying fifty (50) or more tokens in the target document, the fifty or more tokens selected in accordance with term-frequency inverse document frequency metrics for tokens in the target document.

(A5) Optionally, in the method of any of A1-A4, the predefined similarity criteria include a threshold score for a similarity metric that quantifies similarity of respective files to the target document.

(A6) Optionally, the method of any of A1-A5, includes, at each of N respective machines in the collection of machines: receiving and locally storing inverse-document frequency (IDF) values corresponding to a set of tokens, wherein the set of tokens includes a set of target tokens, comprising the tokens in the target document corresponding to the token identifiers in the similarity search query. Further, the method of any of A1-A5, includes, at each of N respective machines in the collection of machines, in response to receiving the similarity search query: for each respective file of a plurality of files stored at the respective machine, computing a similarity metric in accordance with the IDF values corresponding to target tokens in the set of target tokens, term frequencies of the target tokens in the respective file, and term frequencies of the target tokens in the target document.

(A7) Optionally, in the method of A6, the similarity search query includes, for each token identifier in the similarity search query, a term frequency (TF) value corresponding to a frequency of a corresponding token in the target document.

(A8) Optionally, in the method of any of A1-A5 the similarity search query includes, for each token identifier in the similarity search query, a term frequency (TF) value corresponding to a frequency of a corresponding token in the target document or a term frequency inverse document frequency (TFIDF) value for the corresponding token in the target document.

(A9) In some embodiments, the method of any of A1-A8 includes maintaining, at each respective machine of the N respective machines, an inverse document index, wherein the inverse document index maps tokens in locally stored files, locally stored at the respective machine, to files that include content corresponding to the tokens mapped by the inverse document index.

(A10) Optionally, in the method of A9, the inverse document index is indexed by hashed token identifiers, hashed using a predefined one-way hash function, and the similarity search query includes hashed token identifiers corresponding to tokens in the target document.

(A11) Optionally, in the method of any of A2-A3, the direct duplex connection is an encrypted communication connection in which information sent by the respective machine to the external machine is encrypted.

(A12) In some embodiments, the method of any one of A1-A11 includes, at each respective machine of the N respective machines: storing the first report in a local database of the respective machine prior to receiving the a request from the respective server to send the first report.

(A13) Optionally, in the method of any one of A2-A3, the external machine is the respective server.

In some embodiments, a distributed computer system (e.g., machine 102, administrator's device 116, server 108 and/or server 110, FIGS. 1A-1B, FIGS. 7-9) includes computers, or computer-controlled devices, each having one or more processors and memory storing one or more programs for execution by the one or more processors, the one or more programs include instructions for performing, or controlling performance of, the operations of any of the methods described herein.

In some embodiments, a non-transitory computer readable storage medium stores one or more programs, the one or more programs comprising instructions, which, when executed by a computer system (e.g., machine 102, administrator's device 116, server 108 and/or server 110, FIGS. 1A-1B, FIGS. 7-9) with one or more processors, cause the computer system to perform, or control performance of, the operations of any of the methods described herein.

In some embodiments, a computer system (e.g., machine 102, administrator device 116, server 108 and/or server 110, FIGS. 1A-1B, FIGS. 7-9) includes means for performing, or controlling performance of, the operations of any of the methods described herein.

Other embodiments and advantages will be apparent to those skilled in the art in light of the descriptions and drawings in this specification.

BRIEF DESCRIPTION OF THE DRAWINGS

FIGS. 3A, 3B, 3C and 3D illustrate examples of a reverse index, similarity search query, local dictionary and global dictionary, respectively, in accordance with some embodiments.

FIGS. 5A-5C collectively illustrate example reports produced or returned in response to queries, in accordance with some embodiments.

FIGS. 6A-6C illustrate example reports produced in response to quick searches, and FIGS. 6D-6E illustrate example reports produced in response to similarity search queries, in accordance with some embodiments.

Like reference numerals refer to corresponding parts throughout the drawings.

DESCRIPTION OF EMBODIMENTS

Figure 1A:
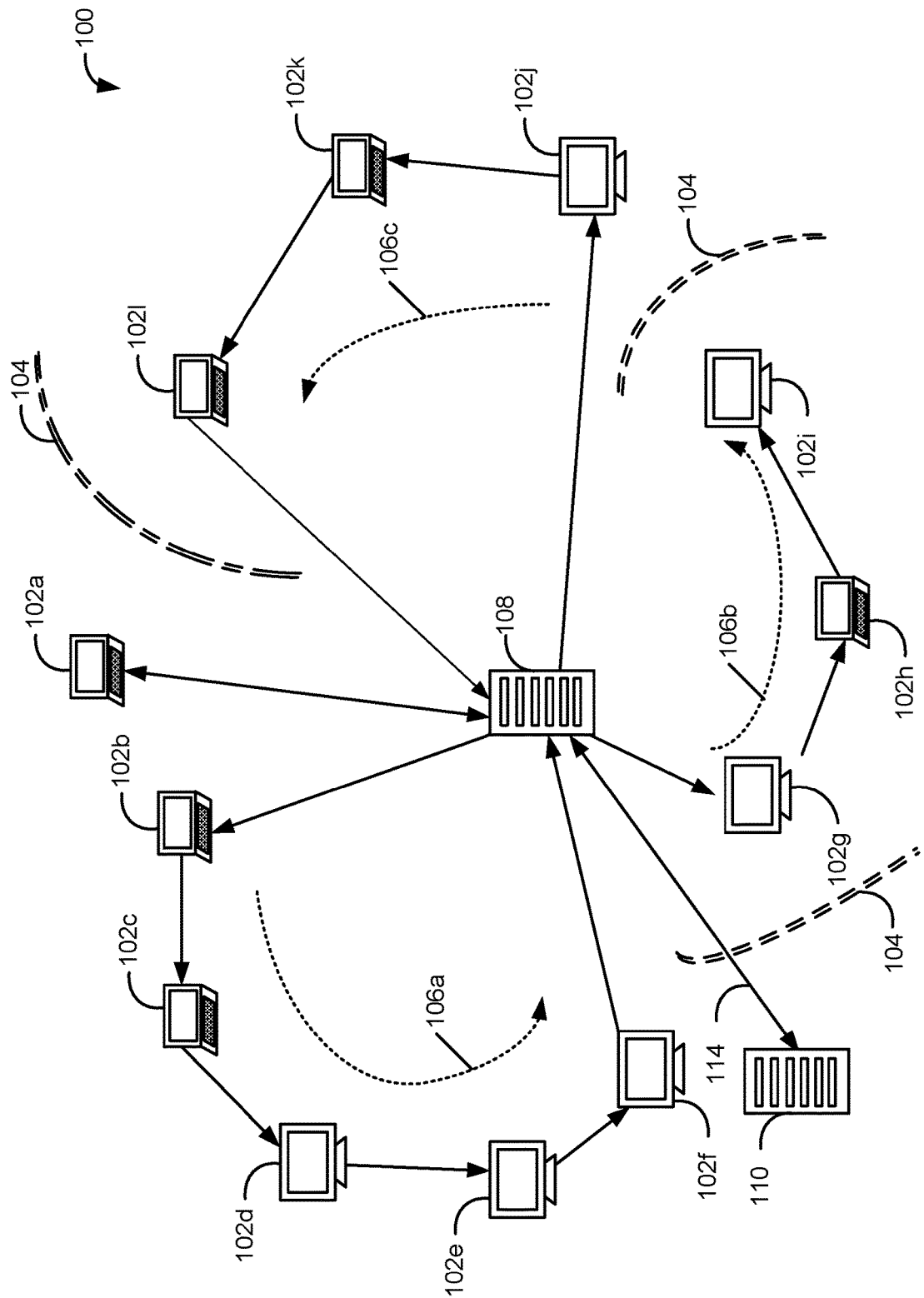
FIGS. 1A-1B illustrate a computer network organized into linear communication orbits, in accordance with some embodiments.

Some methods and devices described herein improve upon endpoint machine examination and management by a) providing for endpoint self-examination (e.g., upon receipt of a set of search rules), b) providing for quicker search result reports from a network of machines, and c) establishing a trusted client-initiated connection (e.g., for investigation by a remote server or administrator's machine).

In some embodiments, the client is a respective machine in a collection of machines that forms a linear communication network (e.g., a non-branching bi-directional communication orbit) as described in the Incorporated Disclosure, which sets forth a network topology in which messages are passed from machine to machine within the linear communication orbit. To initiate a search of client machines, a respective server injects a set of rules into the linear communication orbit. This set of rules travels from machine to machine though machines upstream (in the linear communication orbit) of the respective machine before reaching the respective machine. In response to receiving the set of rules, the respective machine performs a search of relevant files stored at the respective machine and builds a local data base of rule evaluation results.

The client-initiated outbound connection can be used subsequently by the remote server to request reports from the client without requiring the client to open its network firewall (e.g., without requiring the client to open inbound ports in its network firewall). To establish the trusted client-initiated connection, the remote server injects an instruction packet into the linear communication orbit, which travels from machine to machine through the machines upstream of the respective machine before reaching the respective machine. The instruction packet includes instructions for establishing a direct duplex connection (e.g., a direct full-duplex connection, such as a WebSocket connection) with the remote server (or an external administration machine. The respective machine establishes the direct duplex connection according to the instructions received through the linear communication orbit. Thereafter, the respective machine can send secure messages (e.g., encrypted messages) and upload report data directly to the remote server (e.g., rather than by propagating messages from machine to machine through the linear communication orbit); and, the remote server can interact directly with the respective machine in the network rather than through the network's server and the linear communication orbit.

The direct duplex connection (e.g., a point-to-point direct full-duplex connection) can be used by security incident responders, (who are, for example, network administrators of the monitored network, and/or third-party security incident responders associated with the remote server) to pull local data from the respective machine, including event histories, malware files and artifacts, etc. In some embodiments, the remote server can setup a sandbox environment (e.g., a virtual machine mirroring certain conditions and/or files on the respective machine) to perform forensic investigation of security incidents on the respective machine.

In a typical scenario, a remote server or external machine sends a set of one or more rules to some or all of the machines in the network using machine-to-machine communication within the linear communication orbit and server-to-server communication to communicate back to the external machine. A respective machine in the linear communication orbit receives (e.g., through the linear communication orbit) an initial query including a set of one or more rules. To request a direct connection (e.g., to send and receive sensitive material), the remote server uses the linear communication orbit to send an instruction packet to the particular machine, and allows the particular machine to establish a direct duplex connection with the remote server through an outbound connection request from the particular machine to the remote server. The remote server then takes a deep-dive (e.g., performs forensic analysis) into event histories at the particular machine using the direct duplex connection (e.g., requesting the machine to upload event artifact data and/or to upload a snapshot of a local event database, and requesting the machine to answer one or more queries, etc.).

Figure 7:
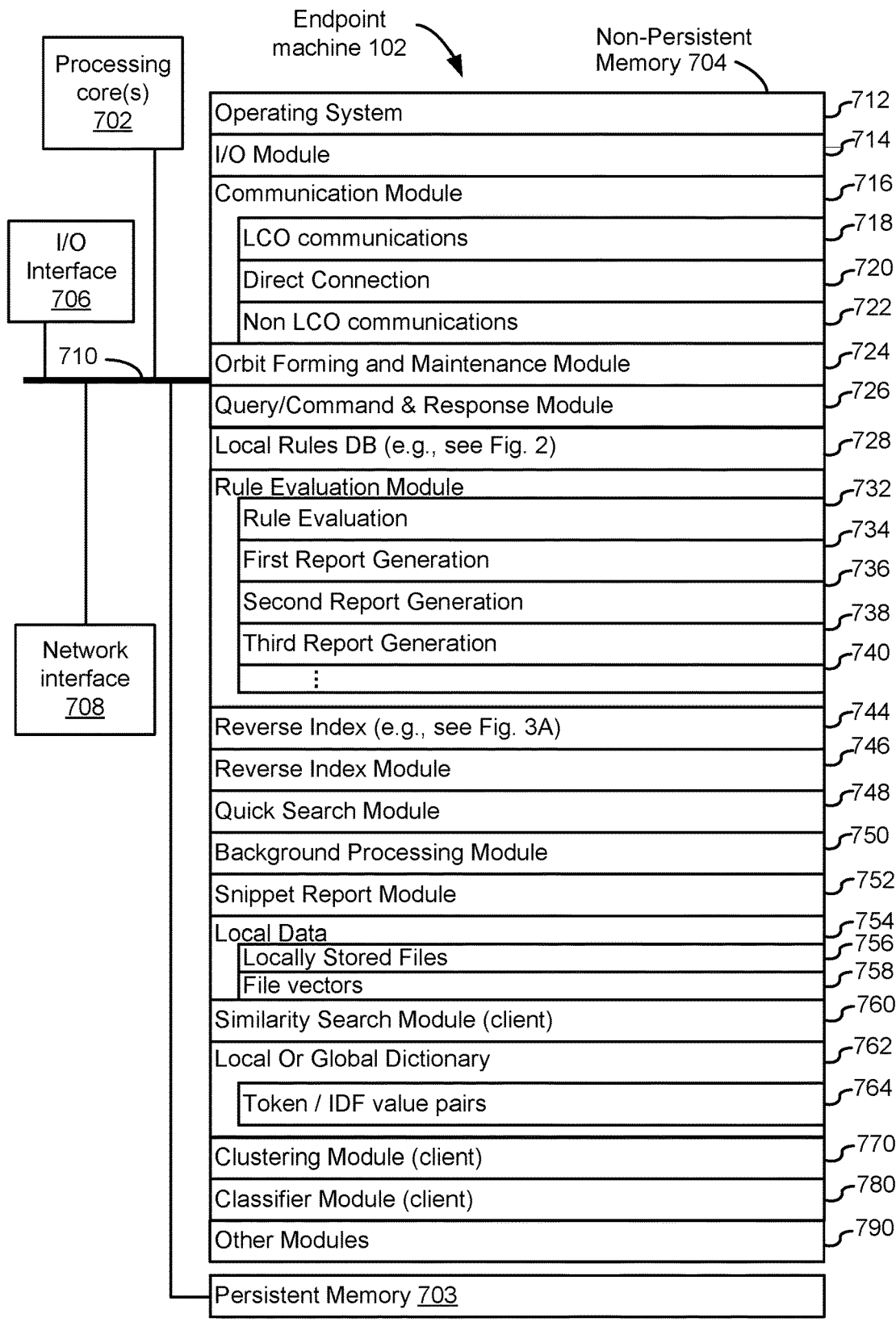
FIGS. 7 and 7A are block diagrams of a system (e.g., an exemplary endpoint machine), in accordance with some embodiments.
Figure 8:
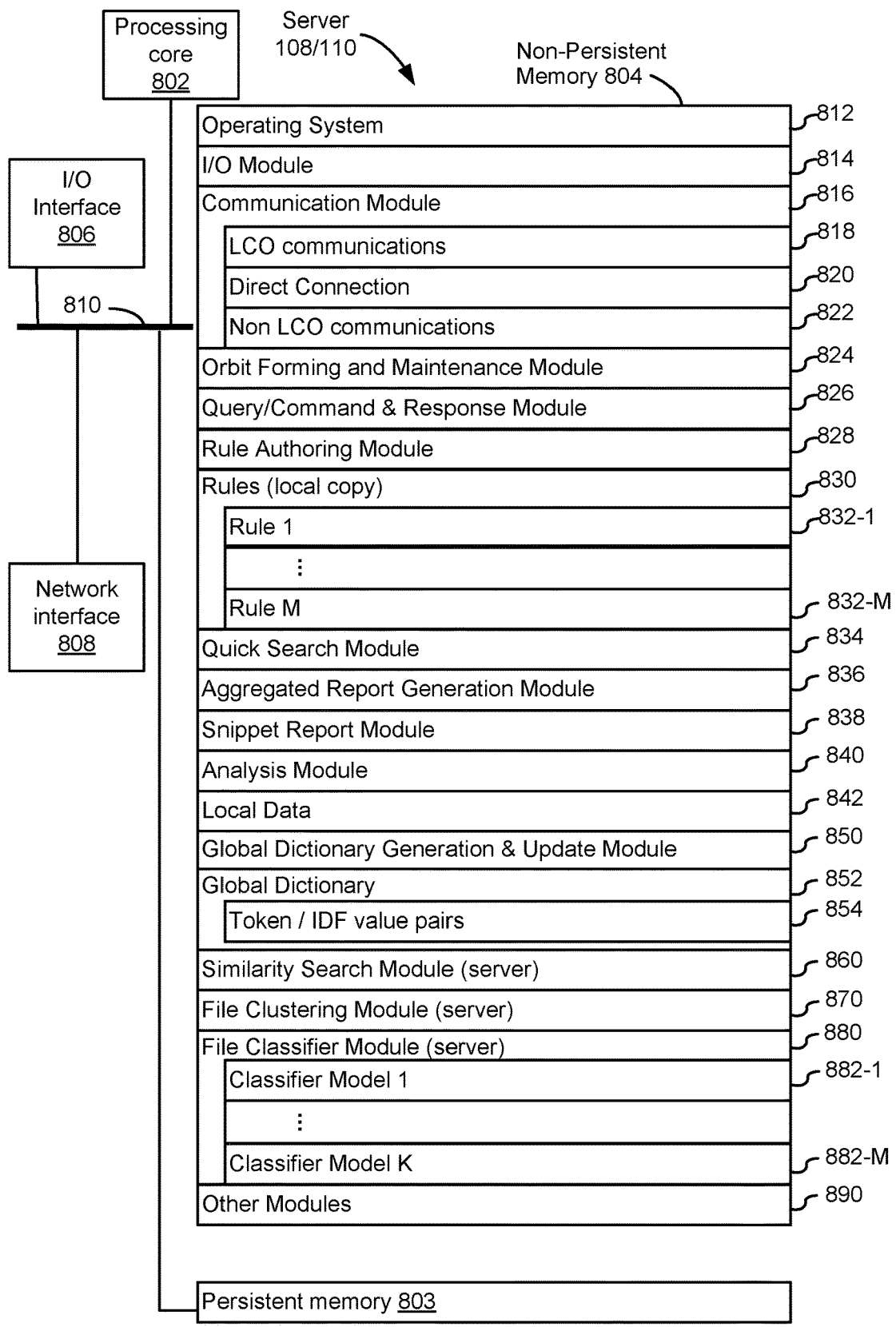
FIG. 8 is a block diagram of a system (e.g., an exemplary server of the network), in accordance with some embodiments.
Figure 9:
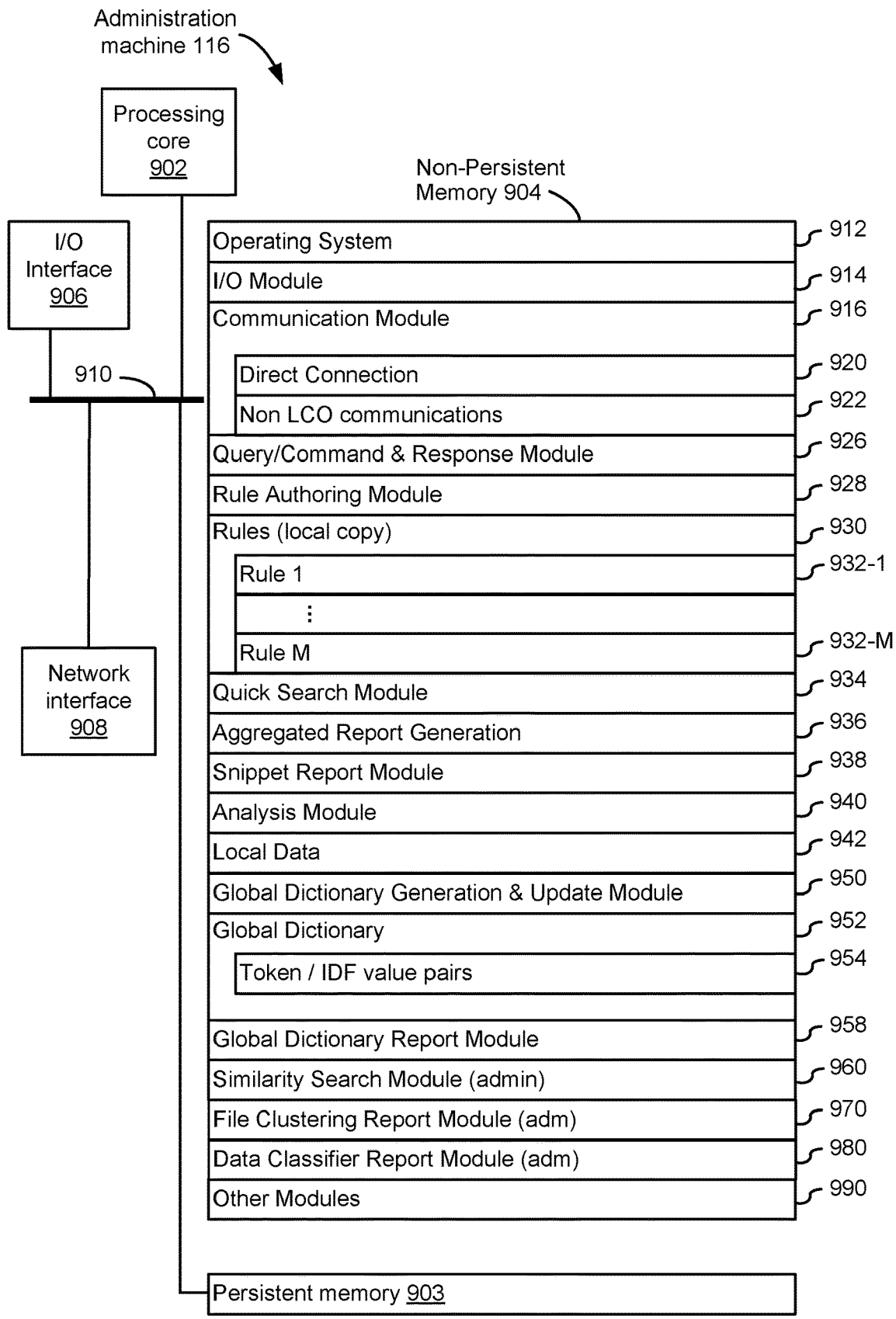
FIG. 9 is a block diagram of a system (e.g., an exemplary administrator's device or machine external to the network), in accordance with some embodiments.

Linear communication orbits are described below with reference to FIG. 1A. FIG. 1B illustrates a schematic diagram of a direct duplex connection between a machine in a linear communication orbit and a remote server. FIGS. 7-9 are block diagrams of machines in a network or machines interacting with a network (e.g., a machine, a server of a network, and an administrator's device).

Figure 1B:
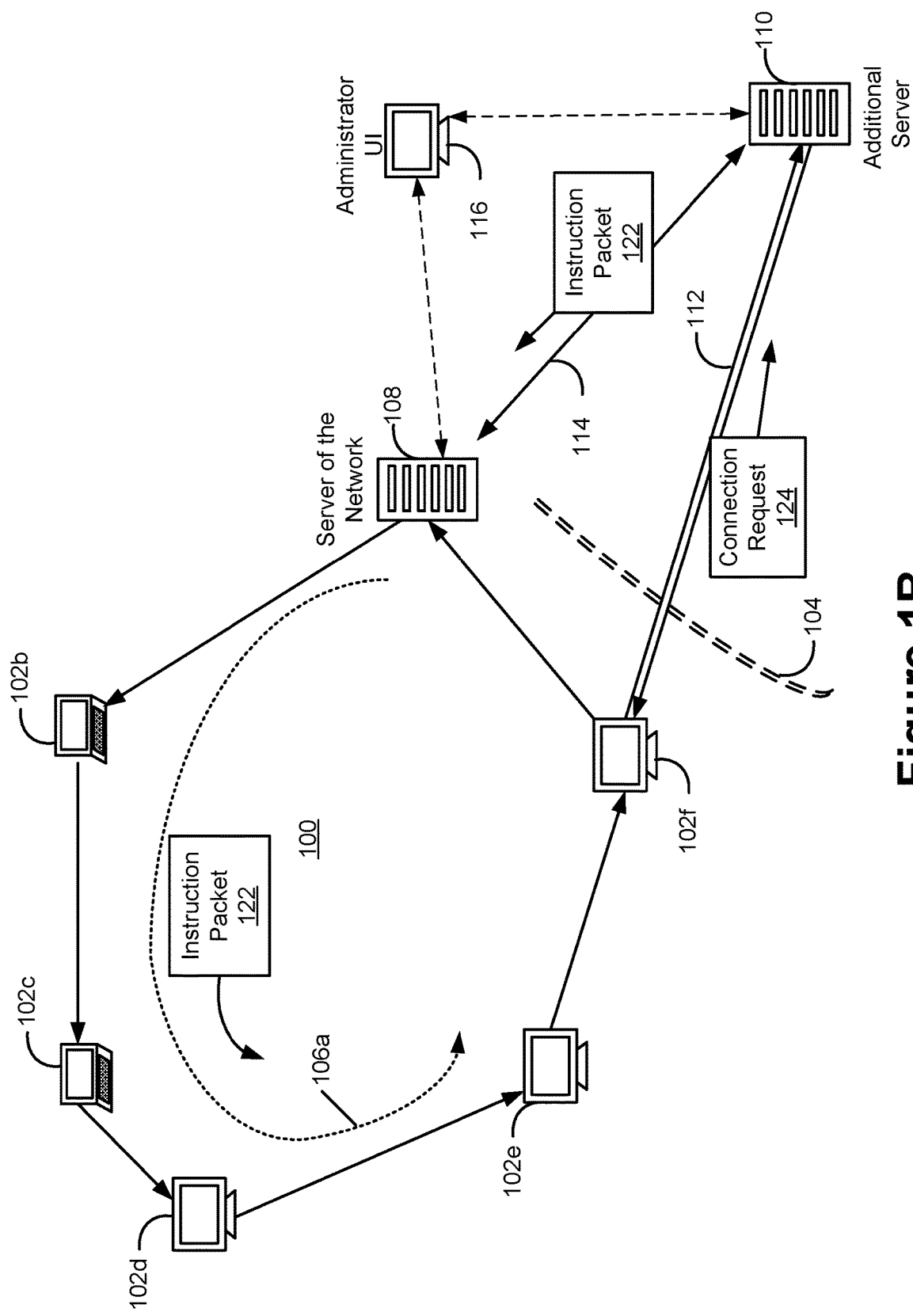

FIG. 1A illustrates a computer network organized into linear communication orbits, in accordance with some embodiments. More specifically, FIG. 1A illustrates a managed network 100 comprising a plurality of interconnected machines 102 (including 102a-1), e.g., computers, servers, mobile devices, and other networked devices that are arranged into one or more linear communication orbits. In some embodiments, the network monitoring methods described herein are performed at one or more machines (e.g., machine 102, see FIGS. 1A and 1B) of a linear communication orbit. In some embodiments, the methods described herein are performed at a remote server (e.g., remote server 110) that is not part of network 100 and is optionally separated from network 100 by a firewall 104, see FIGS. 1A and 1B). In some embodiments, the methods described herein are performed at an administrator's device (e.g., administrator's device 116 that interacts with one or more machines 102 through server 108 of the network and/or remote server 110, see FIG. 1B). The linear communication orbit structure shown in FIG. 1A is an alternative to the conventional hub-and-spoke or hierarchical architecture for managed networks. However, in some embodiments, the network monitoring methods described herein are performed at one or more machines/servers of a hub-and-spoke network, where the remote server sends the instruction packet to a respective machine through the server of the hub-and-spoke network or the top machine of hierarchical architecture, and allow the respective machine to initiate the outbound connection request to the remote server. However, in such cases, the benefit and efficiency of the linear communication orbit may be lost.

Examples of managed network 100 include enterprise networks or other networks under common management. In some embodiments, at least some of machines 102 coupled to managed network 100 are distributed across different geographical areas and/or localized at the same physical location. In some embodiments, machines 102 coupled to managed network 100 are divided into several sub-networks separated by one or more firewalls 104. In some embodiments, the network 100 is separated from external networks by one or more firewalls 104.

In some embodiments, machines 102 currently coupled to network 100 are self-organized into one or more contiguous segments 106 of a single linear communication orbit. In some embodiments, each contiguous segment 106 constitutes a respective linear communication orbit. Methods of self-organization of linear communication orbits are further described in U.S. application Ser. No. 15/004,757, filed Jan. 22, 2016, now U.S. Pat. No. 10,136,415, entitled "System, Security and Network Management Using Self-Organizing Communications Orbits in Distributed Networks," which is hereby incorporated by reference in its entirety.

In some embodiments, managed network 100 also includes server 108 that facilitates the creation and maintenance of the one or more contiguous segments 106. The server 108 may be relatively lightweight, and in some embodiments may be elected from machines 102 in the network.

In some embodiments, as shown in FIG. 1A, the linear communication orbit linking all of the machines coupled to network 100 includes a respective communication channel between each pair of adjacent machines in an ordered sequence of all machines 102 in network 100. In some embodiments, communication between a pair of adjacent machines 102 (e.g., machine 102g and machine 102f) across a firewall 104 may need to be bridged by an intermediate server (e.g., server 108).

An important feature of linear communication orbit(s) 106 is that, in some embodiments, they are automatically formed without global, continuous, and/or active intervention by any network administrative program or personnel. Each machine 102 joining network 100 is equipped with (or provided with) a set of predetermined organization rules. According to the set of predetermined organization rules, each machine 102 finds its immediate neighbor machines and coordinates with these immediate neighbor machines to self-organize into a local segment of the linear communication orbit. The local segments of adjacent machines overlap and fuse into a contiguous segment of the linear communication orbit. In some embodiments, the linear communication orbit grows or contracts as machines join and leave network 100 (e.g., the network is non-static), through the independent local actions of the machines in network 100, without global, continuous, and/or active intervention by any network administrative programs or personnel. Although all machines 102 implement the same set of predetermined organization rules, and each machine directly interacts only with its immediate neighbor machines to facilitate the formation of the orbit, the predetermined organization rules are designed in a way that cause the machines' independent local actions to be globally consistent and to result in self-organization and automatic repair and maintenance of linear communication orbit(s) 106.

In some embodiments, all machines 102 coupled to network 100 are sorted into an ordered sequence according to a respective unique identifier associated with each machine 102. These identifiers are also referred to as the addresses of the machines in the network. For example, in some embodiments, respective IP addresses of machines 102 are used as the identifiers to sort the machines into an ordered sequence. In some embodiments, the machines are sorted according to decreasing IP address values, an upstream direction of the linear communication orbit is the direction of increasing IP address values, and a downstream direction of the linear communication orbit is the direction of decreasing IP address values. In some embodiments, the machines are sorted according to increasing IP address values, an upstream direction of the linear communication orbit is the direction of decreasing IP address values, and a downstream direction of the linear communication orbit is the direction of increasing IP address values.

In some embodiments, other types of unique identifiers or addresses may be used. For each type of unique identifier or address, the set of predetermined organization rules provides a deterministic way of sorting the unique identifiers or addresses of that type into an ordered sequence. Given the identifiers or addresses of two machines in the network, the relative order of the two machines and their distances in the linear communication orbit (also referred to as an interval between the two machines) can be determined. In some embodiments, not all possible addresses are occupied by a corresponding machine in the network.

In some embodiments, each machine 102 receiving a communication message (e.g., a message including a question part, and an answer part) from its upstream neighbor machine acts upon the message by providing an update to the message based on its local state or information, performing some aggregation of the information in the message (e.g., by adding to or modifying aggregated results already included in the message as received from its upstream neighbor), and/or forwarding the message to its downstream neighbor machine along the linear communication orbit. Essentially, each machine expends a small amount of resources to take on a small part of the duties of data aggregation without being overly burdened. More details on how the system, security, and network management messages are propagated to and collected from machines 102 in network 100 through linear communication orbit(s) 106 are provided in the Incorporated Disclosure.

An advantage of conveying message communications over the linear communication orbit is that queries, answers, and/or instructions regarding threat detection and management can be quickly passed to and from many machines without excessive communication and computational over-head. In some embodiments, server 108 (or a remote server 110 in communication with server 108) generates individual queries, where each query contains a request for evaluation of one or more rules at one or more targeted machines (e.g., machines that meet certain criteria specified in the query). In some embodiments, the server determines the order, frequency, and/or priority by which the queries should be injected. In some embodiments, the server sends out all of the queries and the evaluation criteria that individual machines can use locally to prioritize the evaluation of the rules in the queries. The individual machines perform local evaluation of the rules with the order and frequencies set in accordance with the evaluation criteria, and send the results back to server 108 through the linear communication orbit.

In some embodiments, server 108 sends the results (e.g., sends an aggregated response) to remote server 110. In some embodiments, remote server 110 communicates with server 108 via secure connection 114. In some embodiments, when remote server 110 needs to send a message or instruction packet to a particular machine in the network and a direct connection between remote server 110 and the particular machine does not already exist, remote server 110 optionally sends the message to server 108 and has server 108 forward the message or instruction packet to the particular machine along the linear communication orbit. In some embodiments, remote server 110 starts a network-wide information gathering processes by sending a series of queries to server 108 (or a head machine of the linear communication orbit), allowing server 108 (or the head machine) to propagate the queries into the network along the linear communication orbit, and receiving the answers or evaluation results (e.g., individual answers, aggregated answers, and/or metrics and statistics computed based on the answers or evaluation results collected from the machines in the network) from server 108 (or an end machine of the linear communication orbit).

The lightweight, decentralized mechanism (e.g., the set of common action rules observed by the machines in the network) allows the machines in the network to self-organize into one or more linear communication orbits, and allows the linear communication orbits to recover/self-heal from broken links and slow connections (e.g., by temporarily bypassing the unresponsive machines) without active administrative intervention. The self-organization and self-healing aspects of the linear communication orbits ensure that communication and data collection bottlenecks are quickly discovered and eliminated, without causing much observable impact on the communication and data collection speed. In addition, when collecting data along the linear communication orbits, the server may inject queries regarding different aspects of the machines in separate messages, and the messages may be propagated down the linear communication orbit, processed in parallel at the machines, and answered by as many machines as possible (e.g., machines that satisfy per matching criteria specified by the messages), without being held up by any slow responding machines. In fact, communication with and data collection from any and all machines in the network (e.g., enterprise networks with thousands or millions of machines) may be accomplished in substantially real-time (e.g., a matter of seconds), as opposed to taking days and weeks in a network with a conventional hierarchical or hub-and-spoke configuration. For example, messages are delivered to the machines at the speed at which messages are propagated through the linear communication orbit, and the processing of the queries at the machines occurs after receiving the messages, in parallel at the machines. In some embodiments, answers to the queries are collected in a subsequent traversal of the linear communication orbit by either the original messages (propagating in the reverse direction) or by subsequent "answer collection" messages.

FIG. 1B illustrates that, in some embodiments, remote server 110 communicates (e.g., sends messages and/or queries) directly with a respective machine (e.g., machine 102*f*) over direct duplex connection 112 (e.g., a Web Socket connection). Various methods are provided herein for establishing direct duplex connections between remote server 110 and machines 102 in a linear communication orbit. For example, a direct duplex connection is established between a respective machine and the remote server (e.g., remote server 100), in accordance with some embodiments. In some embodiments, the direct (e.g., point-to-point) duplex connection can be used by the remote server to perform event inquiries at the respective machine. In some embodiments, the remote server performs certain queries at the direction of an administrator. The administrator interacts with the remote server using an administrator's device (e.g., administrator's device 116) that is connected to the remote server (e.g., remote server 110) via a web interface or an application user interface provided by the remote server. In some embodiments, the administrator's device is also connected to a server of the network (e.g., server 108). The administrator can communicate with (e.g., issue instructions and questions, and receive responses) a particular machine in the network through the remote server, when a direct duplex connection has been established between the remote server and the particular machine. The administrator can also communicate with a particular machine through a server of the network (e.g., issue queries to the server of the network and have the query propagated along the linear communication orbit, and receive aggregated answers collect from machines along the linear communication orbit).

Direct duplex connection 112 is particularly useful when a remote server needs to take a deep-dive into a respective machine in the network (e.g., to carry out frequent back and forth interactions and/or to transfer large amount of local event data and/or to request sensitive information), rather than investigating the network at-large. The messages and/or queries can be analogous to those described above (or can contain different material), but they are sent directly to the respective machine via direct duplex connection 112 (rather than being propagated through linear communication orbit 106*a*), and without the communication needing to be bridged by server 108. In some embodiments, only those queries sent via a direct duplex connection return certain types of information to the external server (e.g., snippets of file text are only sent via secure direct duplex connections, not through a linear communication orbit). In some embodiments, remote server 110 can communicate with the respective machine either through direct duplex connection 112 (e.g., when remote server 110 wants to query only the respective machine) or through linear communication orbit 106*a* (e.g., when remote server 110 wants an aggregated response to a query from some or all of the machines 102 in the linear communication orbit 106*a*).

As described herein, the direct duplex connection between a particular machine and remote server 110 is established with the particular machine as the initiating party. In other words, from the perspective of the network, the connection is established with an outbound connection request sent from the machine, rather than with an inbound connection request sent from the remote server. When the direct duplex connection is established with an outbound connection request sent from the machine (e.g., the machine sends the initial connection request in the connection establishment protocol (e.g., the handshake request in establishing a Web Socket connection)), there is no need to open the firewall of the network, which would expose the network to outside security risks.

In some embodiments, in order to prompt a particular machine to initiate the connection request for a direct duplex connection, remote server 110 sends a message or instruction packet 122 to the particular machine (e.g., machine 102*f*) through a server of the network (e.g., server 108) and has the message or instruction packet 122 propagated to the particular machine through the linear communication orbit (e.g., linear communication orbit 106*a*). The message or instruction packet 122 contains instructions and necessary data (e.g., public certificate for encryption, IP address, port #) for the particular machine to establish the direct point-to-point persistent connection (e.g., a WebSocket connection) with the remote server. When the particular machine receives the instruction packet 122 from its upstream machine, the particular machine initiates the outbound connection request 124 to the remote server. After the remote server receives the connection request 124 from the particular machine, the remote server and the machine can proceed to establish the duplex connection according to the connection protocol.

In some embodiments, the direct connection is an encrypted communication connection, in which information sent by the particular machine is encrypted, as described above. In some embodiments, the instructions comprise an instruction packet 122 that includes an encryption key for encrypting the local data at the respective machine before uploading to the local data to the respective server. The respective server possesses a decryption key corresponding to the encryption key. The instruction packet further includes instructions for encrypting the local data before uploading the local data to the respective server through the direct connection.

In some embodiments, apart from presenting the network monitoring user interface to an administrator, the administrator's device can also be a regular machine in the network and have the same characteristics and functions of other machines in the network with respect to the maintenance and workings of the linear communication orbit. In some embodiments, the server of the network can be lightweight and in some embodiments may be implemented by a machine in the network; thus, the administrator's device can also serve as the server of the network in some scenarios. When the administrator's device also serves as the server of the network, actions performed "through the server of the network" are performed by the administrator's device directly.

In some embodiments, the instruction packet 122 can be dispatched to one or more particular machines at the command of a network administrator or security incident responder. For example, the network administrator uses an administrator's device 116 to connect to remote server 110 (e.g., via a web interface or a client application provided by a service provider associated with the remote server 110) and manually selects the particular machines using a network monitoring user interface. In some embodiments, the network monitoring user interface provides other functions as described in the Incorporated Disclosure.

In some embodiments, an event recorder is deployed on each machine in the network that continuously records local values for particular indicator items (e.g., commonly used indicator items, such as filenames of newly created/modified/deleted/executed files, IP addresses of network connections, ports accessed, and processes started/killed, etc.) to a local event database. An administrator can query these local event databases from the network monitoring user interface by issuing questions to the network through the linear communication orbit. For example, the administrator's device can send the questions to the server of the network and the questions may be packaged in query messages and propagated to the machines through the server of the network. Each machine along the linear communication orbit will be able to respond quickly to these questions based on the past event data stored in their respective local event databases. After the answers have been collected from all relevant machines in the network, the server of the network forwards the answers back to the administrator's device.

In some embodiments, after a direct duplex connection has been established between a particular machine and the remote server, the administrator (using the administrator's device) can also query the local event database of the particular machine through the direction duplex connection. In addition, the administrator (using the administrator's device) can take a snapshot of the local event database on the particular machine and have it uploaded to the remote server, so that in-depth analysis regarding the particular machine may be performed at the remote server (e.g., according to instructions provided by the administrator to the remote server).

In some embodiments, after a direct duplex connection has been established between a particular machine and the remote server, the administrator (using the administrator's device) can collect snippets of file content from the particular machine from files of interest identified by evaluation of one or more rules by the respective machine. The administrator (using the administrator's device) can make a copy of the collected snippets and corresponding metadata (e.g., OS version, memory, installed apps, usernames, etc.).

In some embodiments, based on the in-depth analysis performed on a particular machine, the administrator can select particular snippets or files of interest in the network monitoring user interface and, based on analysis of those snippets or files, produce a set of refined rules (e.g., one or more new rules, the addition of one or more new validation rules to an existing rule, or another modification of an existing rule) that can be dispatched to the network for a network-wide analysis. In some embodiments, the administrator's machine, or another machines, is configured to automatically generate refined rules, or candidates for refined rules, based on the identification of examples of files or content that produced particular results in response to a prior version of the rules. The automatic generation of refined rules, or refined rule candidates, facilitates the investigative process of the administrator, and relieves the administrator from having to create the refined rules one by one from scratch.

Figure 2:
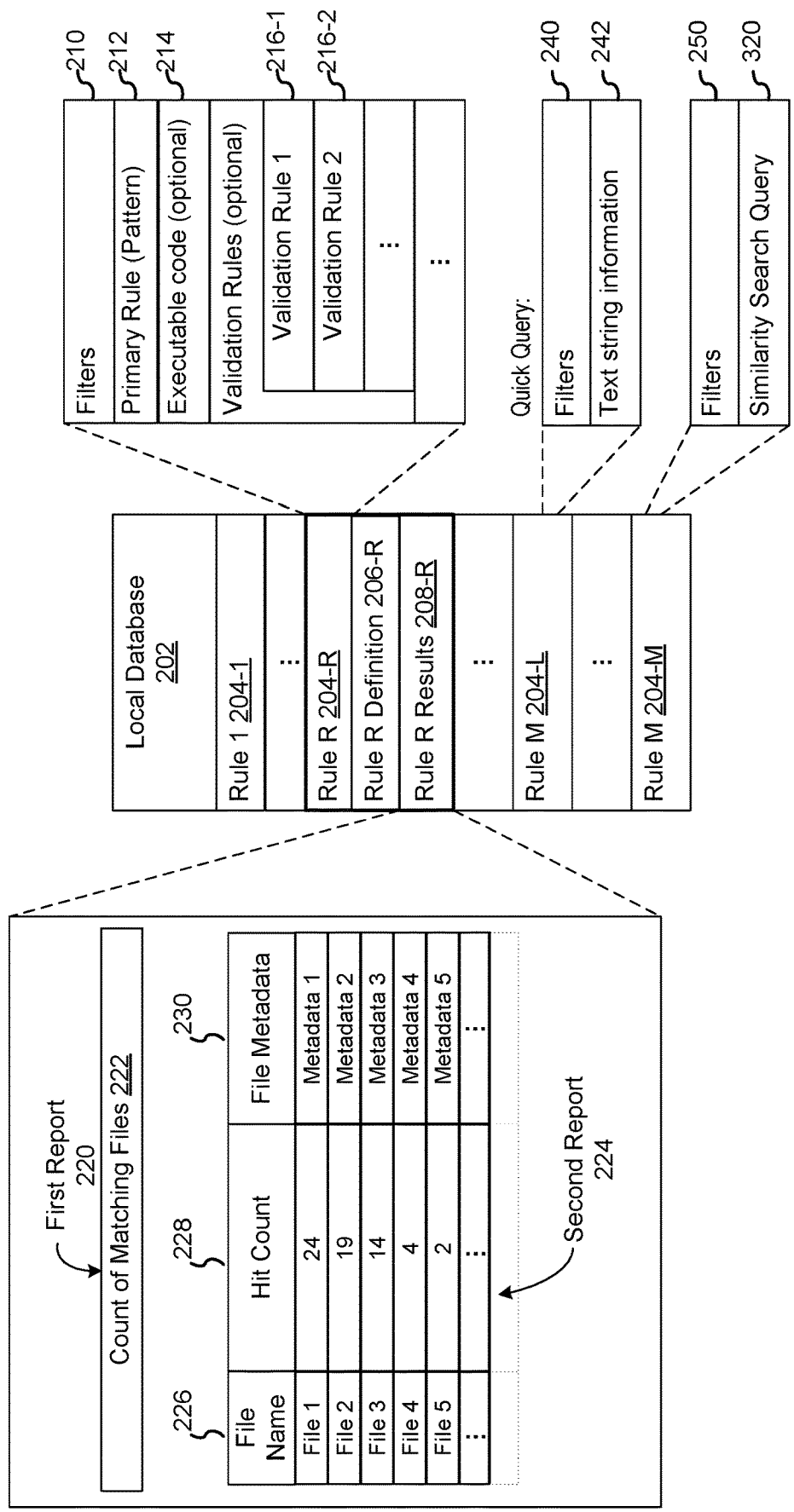
FIG. 2 illustrates an example local database including rule definitions and results, in accordance with some embodiments.

FIG. 2 illustrates an exemplary local database 202 at a respective machine 102. The local database 202 stores a set of one or more rules 204 (e.g., Rule 1, Rule R, Rule L, and Rule M, etc.) and, for each rule, a rule definition 206 and rule results 208. In some embodiments, a rule comprises a regular expression that can be applied to a file. In some embodiments, a rule can contain zero or more filters and zero or more patterns. An example of a rule is "PDF files larger than 100 k that contain an email address and the name of a person." In a first example shown in FIG. 2, the rule definition for Rule 4 206-R includes one or more filters 210 (e.g., instructions on what types of files a respective rule should be applied to, such as "File is PDF" and "File is larger than 100 k"), a primary rule 212 (e.g., a pattern), executable code 214, and a set of two or more validation rules 216. In some embodiments, a pattern is an operation that can generate a positive match (e.g., a hit) based on the text content of a file. Patterns can generally be described starting with "File contain." Many patterns are implemented as a regular expression. Examples of patterns include "File contains an email address" and "File contains the name of a person." In some embodiments, a validation rule is an operation that can make a positive match against a snippet of file content and apply a classification to the corresponding hit in the context of a rule. For example, validations can be described as "Hits where X should be Y." Examples of validations include "Emails from gmail.com should be rejected" or "Names preceded by 'Sincerely' should be validated."

In a second example shown in FIG. 2, a rule, such as Rule L, 204-L, is a quick query. In some embodiments, and in this example, the quick query includes text string information 242, such as a sequence or ordered set of hashed token values that specifies a text string, and optionally includes a filter 240, serving the same purpose as filter 210, described above. The quick query is a request for information about files at endpoint machines that contain the text string specified by the quick query. Quick queries are further discussed below.

In a third example shown in FIG. 2, a rule, such as Rule M, 204-M, is a similarity query. In some embodiments, and in this example, the similarity query includes a similarity search query 320, described in more detail below with reference to FIG. 3B, and optionally includes a filter 250, serving the same purpose as filter 210, described above. The similarity query is a request for information about files at respective endpoint machines that meet predefined similarity criteria with respect to a target file, features of which are represented by the similarity search query 320. In response to receiving the similarity query, a respective endpoint machine applies a predefined similarity function to each of the locally stored files that satisfy the filter 250, if any, to determine the degree of similarity between each of the files and a target file. The respective endpoint machine returns information about the files whose degree of similarity with the target file meets one or more similarity thresholds.

The local database 202 of the respective machine also stores rule results 204 (e.g., results based on hits with respect to a rule of the first type described above). In some embodiments, a hit is a specific piece of text within a file that satisfies a pattern. Examples of hits include "john.doe@gmail.com" or "John Doe." Such rule results include, for a respective rule (e.g., rule 204-R) in the set of one or more rules 204, at least a first report 220 and a second report 224. The first report 220 includes a count of files 222 at the respective machine that include file content that satisfies the respective rule (e.g., files containing at least some content that satisfies rule R 204-R). Defining individual content in a file as satisfying a respective rule depends upon the content matching at least the primary rule 212 for the respective rule. In some embodiments, the second report 224 includes, for a respective rule, such as Rule R, 204-R, file identifying information 226 identifying files at the respective machine that contain file content satisfying the rule. Optionally, the second report also includes a hit count 228 (i.e., a number of content items in the file that satisfy the respective rule) for each identified file, and also optionally includes file metadata 230 (e.g., file size, date created, date last modified, file type, etc.) for each file that satisfies the rule.

Furthermore, in some embodiments, the rule results 208 also include information identifying the file locations (sometimes called hit locations, or offsets from the beginning of a respective file) of the hits for each rule. For example, hit locations in the respective files identified in the second report may be stored in an additional field for each row of the second report 224 (i.e., for each file, a separate field may be used to store the hit locations in that file). In some embodiments, the hit locations are not conveyed along with the second reports, but are used to facilitate the generation of snippets from files identified by the second reports.

In some embodiments, the rule results for a quick query include a first report and a second report, described below with reference to FIGS. 6A and 6B. Furthermore, in some embodiments, quick queries 204-L are stored separately (e.g., in a different local database than local database 202) from rules 204-1 to 204-R and similarity search queries 204-M, and the results produced in response to quick queries are stored separately from the results produced in response to rules 204-1 to 204-R and similarity search queries 204-M.

In some embodiments, the rule results for a similarity query include a first report and a second report, described below with reference to FIGS. 6D and 6E. Furthermore, in some embodiments, similarity search queries 204-M are stored separately (e.g., in a different local database than local database 202) from rules 204-1 to 204-R and quick searches 204-L, and the results produced in response to similarity search queries are stored separately from the results produced in response to rules 204-1 to 204-R and quick queries 204-L.

It is noted that in the description of FIG. 2, the term "first report" has been used to describe first information produced for a particular rule, and "second report" has been used to describe second information produced for a particular rule. However, in some embodiments, and in the descriptions provided below, with respect to embodiments in which the set of one or more rules includes a plurality of rules, the "first report" includes the first reports 220 for all the rules in the set of rules, and the "second report" includes the second reports 224 for all the rules in the set of rules.

FIG. 3A illustrates an example reverse index 302 (e.g., a hash table) that is stored locally at an endpoint machine 102 in a linear communication orbit. In some embodiments, the reverse index 302 includes one or more entries 304 (e.g., 304-1 to 304-X), where each entry 304 of the reverse index corresponds to a respective hashed token 316, and thus corresponds to a word or other term represented by the hashed token 316, and contains information, sometimes called sub-entries 306 (e.g., 306-1 to 306-Q), identifying files at (e.g., stored at, or within) the endpoint machine that contain text corresponding to the respective hashed token. In some embodiments, each entry 304 optionally contains an inverse document frequency (IDF) value 305 for the term corresponding to the entry 304. The term frequency value indicates the importance of an object, e.g., text 310, to the file that contains the object. The inverse document frequency (IDF) value indicates the importance of the corresponding term within a corpus of documents, whether that be a local corpus of documents (e.g., the corpus of documents stored at the endpoint machine), or a "global" corpus of documents, (e.g., the corpus of documents stored in a set of machines across of network). In some embodiments, the IDF value 305 is a local IDF value, corresponding to (e.g., derived from) the number of documents in which the corresponding term is found in a local corpus of documents, while in some other embodiments, the IDF value 305 is a global IDF value, corresponding to (e.g., derived from) the number of documents in which the corresponding term is found in a "global" corpus of documents. It is noted that "global" in this case does not mean all machines in the entire world, and instead means a defined set of machines, typically including all or many machines that are interconnected via a corporate network or a set of communication networks. It is also noted that lower IDF values correspond to terms that are more prevalent among the corpus (e.g., found in larger numbers of documents), and those terms are thereby assigned lower importance than terms with higher IDF values, which are less prevalent (e.g., found in fewer documents) than terms with lower IDF values.

Figure 11:
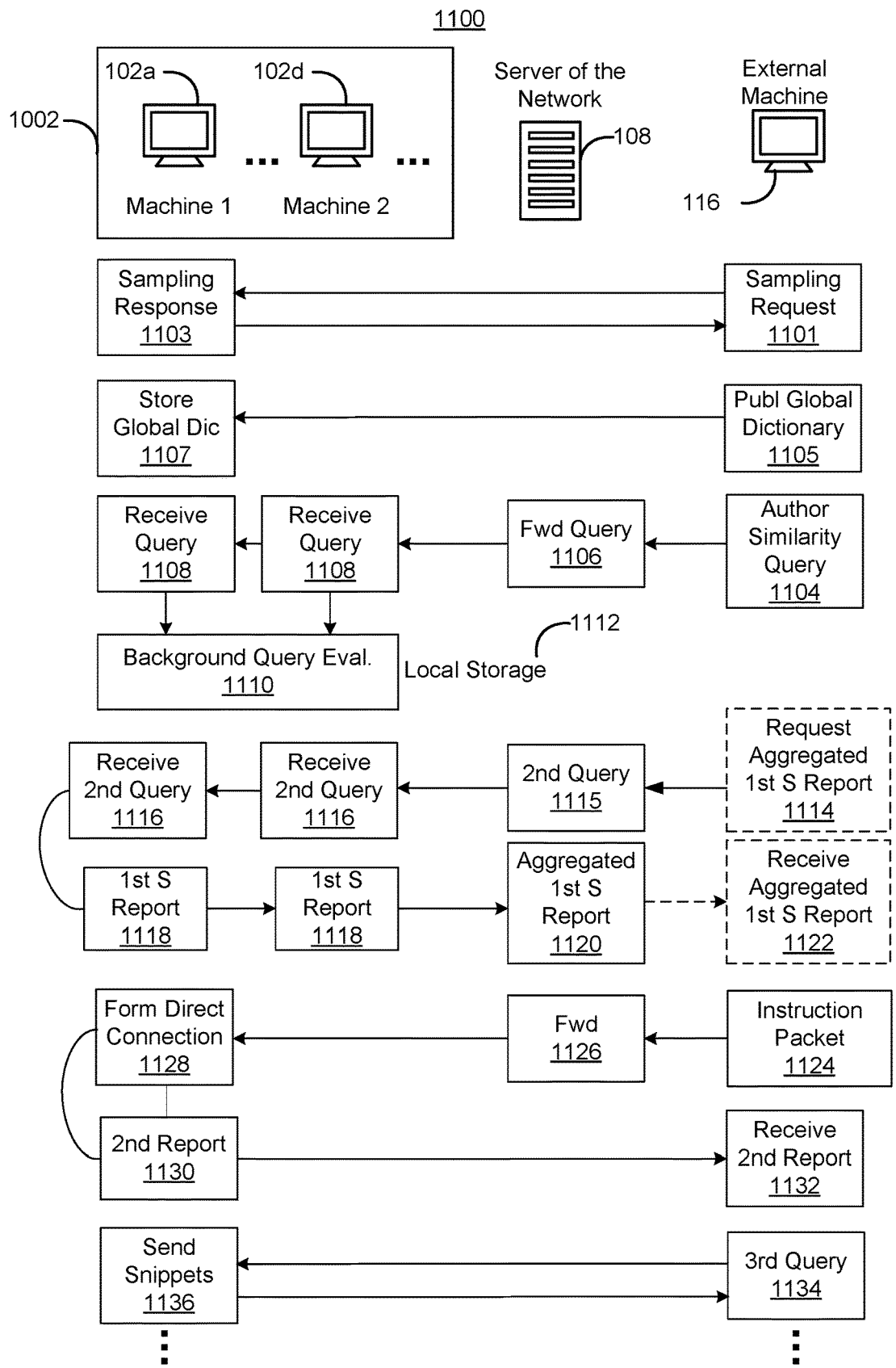
FIG. 11 is a flow chart of a method of report generation and transmission (e.g., by an exemplary endpoint machine) to a requesting server or other external machine, in response to a similarity search query, in accordance with some embodiments.

In some embodiments, each endpoint machine in a set of endpoint machines (e.g., each endpoint machine connected to one or more linear communication orbits, as shown in FIGS. 1A and 1B), while generating its own reverse index 302, also determines a local IDF value for each term for which an entry is stored in the reverse index 302, and stores that local IDF value in the entry 304 for that term. In another example, one or more servers (e.g., server 108, server 110, and/or administrator machine 116) generate global IDF values for terms found in a global corpus of documents, and distribute a global dictionary 340 (FIG. 3D) that includes the global IDF values to the endpoint machines in a set of endpoint machines, in which various portions of the global corpus of documents are stored. As a result, a consistent set of global IDF values are provided to all the endpoint machines in the set of endpoint machines. FIG. 11, described below, includes an example of a process through which a server or other machine obtains the information needed to generate global IDF values and distribute a global dictionary.

Returning to the description of FIG. 3A, in some embodiments, each entry 304 in the reverse index 302 includes one or more subentries 306 (e.g., 306-1 to 306-R), each corresponding to a file in which at least one occurrence of the corresponding term (corresponding to the entry 304) is found. Each entry 306 contains information identifying a file at (e.g., stored at, or within) the machine that contains text corresponding to the respective hashed token. The information identifying a file is denoted in FIG. 3A by "File 1 ID" in entry 306-1 and "File 2 ID" in entry 306-2, and so on. Each entry 306 optionally includes a term frequency (TF), which is a count of the number of times the corresponding term occurs in the identified file. Finally, each entry 306 optionally includes a list of locations ("location list") at which the corresponding term is found in the identified file. For example, each listed location may be an offset from the beginning of the identified file at which an occurrence of the corresponding term is located.

In some embodiments, and typically, the information in an entry 306 identifies both a file and one or more locations in the file having text corresponding to the respective hashed token. It is noted that the data structure shown in FIG. 3A is a conceptual representation of the information stored in the reverse index 302 and of the method of generating hashed tokens, but that the details of how information is stored and organized within the reverse index may vary from one implementation to another. For example, in some implementations, one sub-entry 306 may list all the locations in a file that contain the same token or may contain information (e.g., delta-encoded information) from which all such locations in the file can be derived, while in other implementations, a separate sub-entry 306 is used to indicate each such location.

Generally, each token 312 in a set of files, or in a reverse index 302 for that set of files, represents a chunk of text, such as a word, abbreviation, punctuation symbol, or the like, found in the set of files. Each token is typically represented by a digital value, which in some embodiments is the ASCII or other representation of the token's text, but in other embodiments is a fixed-length digital value that uniquely identifies the token. A hashed token 316 is produced by applying a one-way hash function 314 to the corresponding token 312 to produce a unique value, herein called the hashed token. In some embodiments, the one-way hash function 314 is a predefined hash function, but the hash function receives, in addition to the token 312 to be hashed, a salt value 318. In any one system (e.g., all the endpoint machines and optionally some or all the more servers in one organization's network), the salt value 318 is a constant value that remains the same for all tokens, but prevents other systems (e.g., machines in the networks of other organizations) that don't have the same salt value 318 from being able to search the reverse index 302 for information about the files stored at the respective endpoint system. Stated another way, within a system that uses hashed tokens to construct queries as well as to store information in the reverse index at each endpoint machine 102, the same salt value 318 must be used by all the machines that work together on constructing queries (e.g., server 108 or 110 or administrator's device 116) that include hashed tokens and on answering those queries (e.g., endpoint machines 102).

Since hash functions can, on occasion, depending on their design, produce the same hash value for two different input values (sometimes called a "collision"), in some embodiments, the hash function 314 and the reverse index 302 include a mechanism for assigning unique hashed token values to all the tokens that produce the same initial hash value, or equivalently, ensuring that each distinct token 312 is assigned to a distinct entry 304 in the reverse index 302.

When adding information to the reverse index 302 for a file that is being indexed, each token 312 of the file's text 310 is hashed by the one-way hash function 314 to produce a hashed token 316, which in turn is used to identify an entry 304 of the reverse index 302. A sub-entry 306 is added to the entry 304, identifying the file in which the token is located, and optionally (and typically) also including information identifying the location in the file at which the token is located. Each token that is hashed by the one-way hash function 314 is hashed using the same salt value 318 (if any) as the salt value used by the server or administrator's machine to construct queries.

When removing information from the reverse index 302 for a file that has been removed from the endpoint machine, or that has been updated and is going to be re-indexed, all information items 306 corresponding to that file (e.g., having the filed identifier of the file) are removed from the reverse index 302.

When searching for files that have content (e.g., text) that includes a particular token, the token 312 is hashed 314 (e.g., by server 108 or the administrator's machine 116 that generates the query) to produce a hashed token 316. As noted above, the hashed token values are produced using a predefined one-way hash function 314, and optionally a salt value 318. When the query is received at an endpoint machine, the hashed token 316 is used by the endpoint machine to locate a corresponding entry 304 in the reverse index 302 for that endpoint machine; the corresponding entry 304 includes information identifying all the files (at the endpoint machine) having text matching the token 312. The use of hashed tokens to specify a text string in a search query helps to prevent interlopers (e.g., any machine eavesdropping on communications between machines in the network) from being able to determine the text string for which a search is being performed.

When searching, in response to a query, for files having a specified text string, corresponding to a string of tokens or hashed tokens, lookups in the reverse index 302 are performed for each of the tokens in the string of tokens, and then the results are combined to identify the files, if any, that contain the specified text string, and optionally to also identify the locations in those files at which the specified text string is located. In some embodiments, the query includes not only the hashed tokens in the same order as the corresponding terms are included in the specified text string, the query further includes arrangement information that indicates if any of the terms in the specified text string are separated by "skipped" words or terms, and if so, the arrangement information indicates how many skipped tokens (terms or words) are, or may be, located between specified tokens (e.g., by specifying that the third token follows, and is separated from, the second token by up for N tokens, where N is an integer such as 1, 2, 3, 4, 5 or the like), and this information is taken into account so that only documents that contain that exact phrase match the query (as opposed to simply including all the constituent terms). An example of a query that includes arrangement information would be: HT1, HT2, SEP/6, HT3, HT4 . . . , where HT1 to HT4 are hashed tokens, SEP/6 indicates that the second and third tokens can be separated by up to six tokens, and a matching string must include adjacent first and second tokens, corresponding to HT1 and HT2; adjacent third and fourth tokens, corresponding to HT3 and HT4; and the third token must follow the second token, but can be separated from the second token by up to six intervening tokens. Other arrangement information can be used in various embodiments, such as separation information that indicates an exact number tokens that separates to tokens, and/or separation information that indicates the separating term or terms must be of terms of one or more specific types (e.g., numerical, spaces, punctuation, etc.).

FIG. 3B illustrates an example of a similarity search query 320 that is transmitted by a server to an endpoint machine 102 in a linear communication orbit, and is typically stored locally on the endpoint machine 102 until processing of the similarity search query 320 is complete. In some embodiments, similarity search query 320 includes one or more entries 324 (e.g., entries 324-1 to 324-Q), where each entry 324 of similarity query hash table 320 identifies a term, (e.g., represented by a respective hashed token 326 (e.g., 326-1)), and includes a TF value, TFIDF value, or TF and IDF values 326-2. The TF value, TFIDF value, or TF and IDF values 326-2 indicate for a respect token (e.g., term) in a target document for which similar documents are being sought, the term frequency of that token (e.g., term) in the target document, the inverse document frequency of that term in a respective corpus of documents (e.g., a global corpus or other document corpus), and/or the TFIDF of the term for the target document. Since the similarity search query 320 is sent by a server or administrator machine to the endpoint machine, the TF, TFIDF, or TF and IDF values are values determined by a machine other than the endpoint machine. In embodiments in which a global dictionary (e.g., global diction 340, FIG. 3D) with global IDF values are conveyed to the endpoint machines, the similarity search query 320 will typically include a term frequency (TF) value for each hashed token in the similarity search query 320, or alternatively the TFIDF value for each hashed token in the similarity search query 320, but will typically not include the IDF value for the hashed token, since that information is already available to the endpoint machine in its local copy of the global dictionary 340.

FIG. 3C illustrates an example local dictionary 330 that is stored locally on endpoint machine 102. In some embodiments, local dictionary 330 includes entries 334 (e.g., entries 334-1 to 334-D), where each entry 334 of the local dictionary includes a term-IDF pair 335 that identifies a term (e.g., represented by a hashed token 336-1) contained in a local file, and includes a local IDF value 336-2 for that term, representing the importance of that term in a local corpus of documents. The local IDF value 336-2 in a respective entry 334 corresponds to the number of files stored at the endpoint machine that contain at least one instance of the term corresponding to that entry. Typically, the local IDF values in the local dictionary 330 are computed by the endpoint machine at which it is stored, and the IDF values in the local dictionary 330 are used to compute similarity scores, representing the degree of similarity between locally stored files and the target file represented by a similarity search query (e.g., similarity search query. 320, FIG. 3B).

It is further noted that in systems in which a global dictionary 340 is distributed to and stored at the endpoint machines, a local dictionary 330 is not needed and therefore is not generated and locally stored at each endpoint machine. But in some embodiments, in which a global dictionary 340 is not distributed to and stored at the endpoint machines, a local dictionary 330 is generated and locally stored at each endpoint machine, and the IDF values therein are used in the computation of similarity scores.

FIG. 3D illustrates an example global dictionary 340 that is stored at a server 108 or an external server 110, and which is transmitted to and stored at each of the endpoint machines 102 that may be required to respond to similarity search queries. Similar to the structure of the local dictionary stored on an endpoint machine, the global dictionary 340 includes entries 344 (e.g., 344-1 to 344-G), where each entry 344 of the global dictionary includes a term-IDF pair 345 that identifies a term (e.g., represented by a hashed token 346-1), meeting a minimum threshold of prevalence (e.g., contained in at least one file, or alternatively, contained in at least T files, where T is a predefined threshold value) in a distributed system having multiple endpoint machines, and includes a global IDF value 346-2 for that term, representing the importance of that term in a global corpus of documents. An example of a process for generating and distributing a global dictionary 340 is described below with reference to FIG. 11.

Figure 4A:
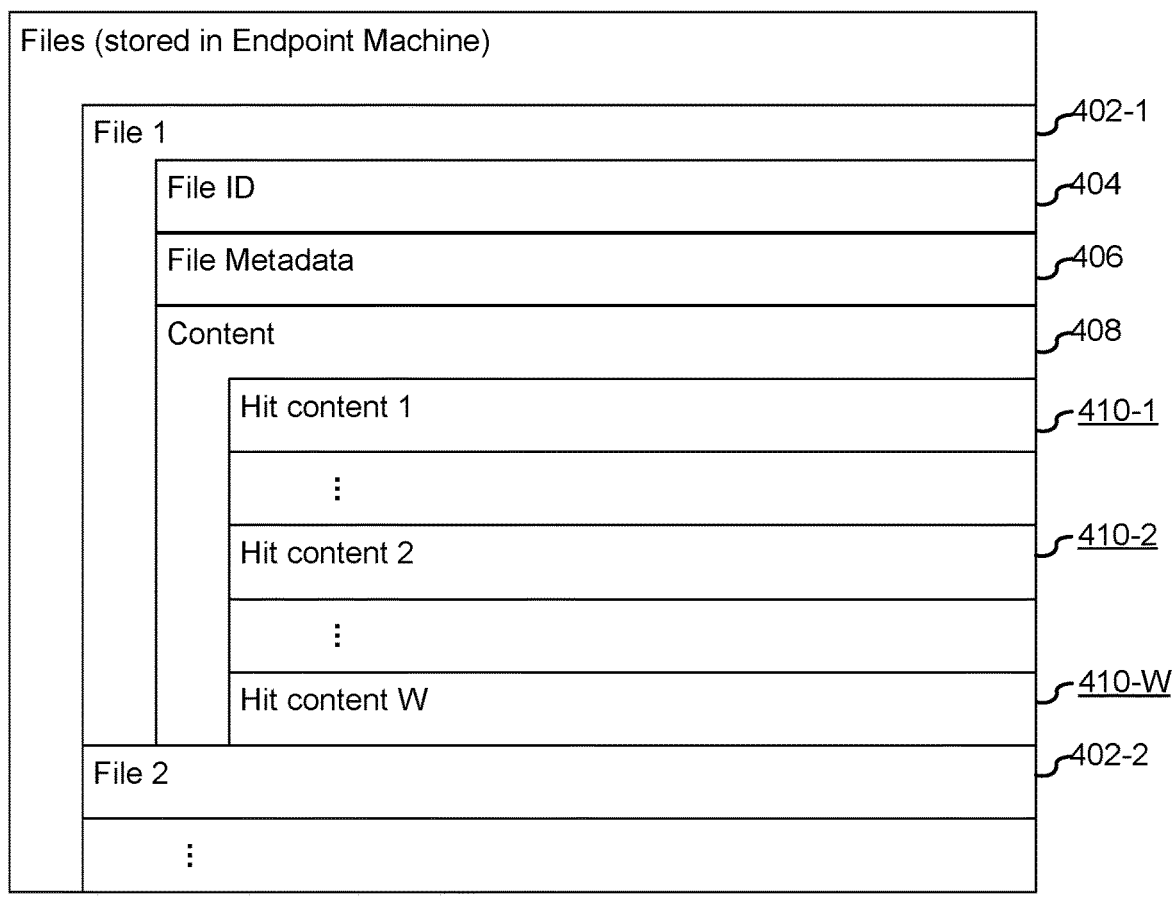
FIGS. 4A and 4B illustrate examples of file information, including content and context, in accordance with some embodiments.
Figure 4B:
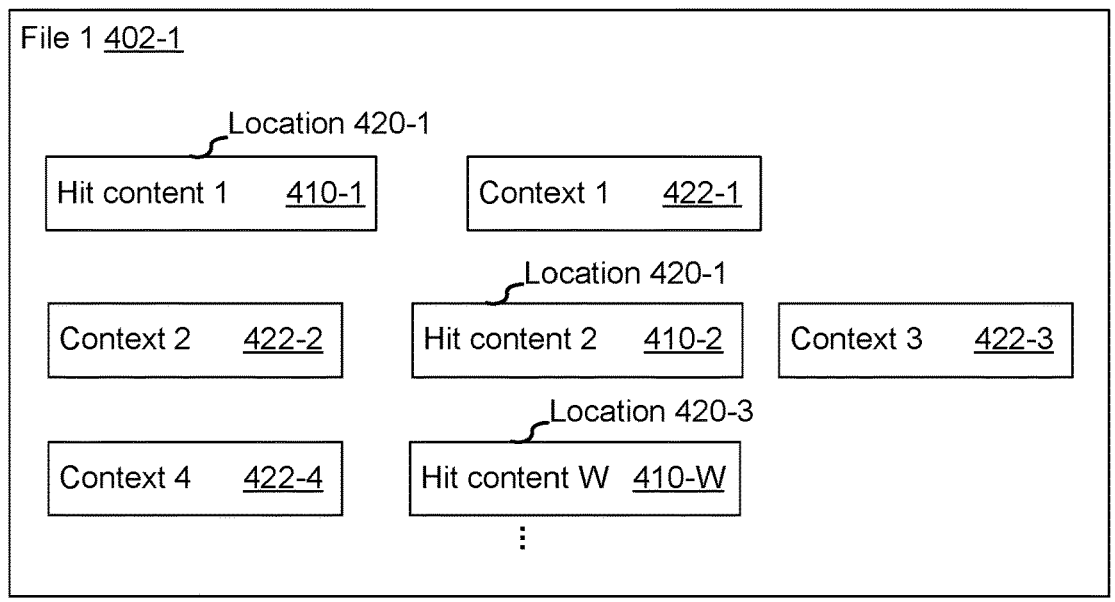

FIGS. 4A and 4B illustrate example contents of files 402 stored at an endpoint machine 102. As shown in FIG. 4A, the information regarding any one file (e.g., file 402-1) that is identified as satisfying at least one rule in the set of one or more rules includes at least the following: file ID 404, file metadata 406, and content 408. In embodiments in which rules (e.g., Rule R 204-R, FIG. 2) for identifying files that include specified patterns of content are processed by endpoint machines, content 408 includes one or more sets of content herein called hit content 410 (e.g., 410-1 to 410-W), where each hit content contributes towards file 402 satisfying a respective rule. As shown in the schema in FIG. 4B, for file 402-1, additional information regarding hit content 410 is available in some embodiments. For example, hit content information for a particular instance of hit content may include the location 420 (e.g., an offset from the beginning of the file) of the hit content within the file and context information 422 (e.g., text adjacent to the instance of hit content). In some embodiments, context for an instance of hit content is located after the hit content (e.g., context 422-1 is located on the same line (or in the same field, or a neighboring field) of file 402-1 as hit content 410-1, after hit content 410-1). In some embodiments, context for an instance of hit content is located before the hit content (e.g., context 422-4 is located on the same line (or in the same field, or a neighboring field) as hit content 410-W, before hit content 410-W). In some embodiments, context is located both before and after an instance of hit context (e.g., context 422-2 is located on the same line as hit content 410-2, before hit content 410-2, and 422-3 is located on the same line (or the same field, or a neighboring field) as hit content 410-2, after hit context 410-2). In some embodiments (not shown), context may be on a different line, or in a different field, of the file than the hit context. In some embodiments, the context of hit content contributes to satisfying a respective rule (e.g., in some embodiments, the context is evaluated by evaluating a validation rule 216 of a respective rule 204 or by evaluating a filter 210 of the respective rule 204).

FIGS. 5A-5C illustrates example reports. In FIG. 5A, an example first report 502 is shown. A first report identifies, for each rule 506 in the set of one or more rules, for each machine 504 in a set of machines that has evaluated the set of one or more rules, a count of files 508 that contain file content at that machine that satisfies the respective rule 506. In some embodiments, the first report 502 also includes additional information such as the total number of matches (e.g., hits) at each machine for each rule 510 and also an indicator 512 of scan process (e.g., whether a respective machine has finished evaluating a respective rule).

FIG. 5B provides an example of a second report 520, which is sent by a respective machine to a respective server or an external machine (e.g., an external server 110). In some embodiments, the second report 520 is sent by the respective machine to the respective server or external machine via a direct duplex connection, as described elsewhere in this document. Second report 520 includes file identifying information 522 identifying files at the respective machine that contain file content satisfying a respective rule in the set of one or more rules. For example, a user or administrator of the external machine may select a row in the first report, thereby identifying both an endpoint machine and a rule, and in response receive an instance of the second report 520 for that machine and rule. In some embodiments, the second report further includes, for each file identified in the second report, a count 524 of content that satisfies the respective rule in the set of one or more rules. In some embodiments, the second report further includes file metadata 526 for each identified file (e.g., one or more of the following: file size, date created, file permissions, date last modified, file type, application that created or last modified the file, etc.).

FIG. 5C provides an example of an example of a third report 540, which is sent by a respective machine to a respective server or an external machine (e.g., an external server) via a direct duplex connection. Third report includes file snippets 542 identified as containing file content satisfying a respective rule in the set of one or more rules. In some embodiments, third report 540 also includes an indication 544 of whether a respective file snippet 542 has been positively identified as satisfying a respective rule (e.g., whether the file snippet satisfies a validation rule of the respective rule). In some embodiments, the third report 540 is produced by the respective machine, and sent to the respective server or external machine, in response to a user or administrator of the respective server or external machine selecting a row in the second report, thereby identifying an endpoint machine, a rule, and a file.

FIGS. 6A-6C illustrates example quick search reports. In FIG. 6A, an example first quick search report 602 is shown. A quick search typically comprises one rule. For example, a quick search may identify a text string, represented by a sequenced of hashed tokens (see discussion of FIG. 3), and comprise a request for information about files at endpoint machines that contain the text string. In some embodiments, the first quick search report 602 identifies, for each machine 604 from which search results are received (or, alternatively, for each machine 604 which reports finding at least one file satisfying the quick search), a count of files 606 that contain file content at said machine that satisfies the rule. In some embodiments, the first report 502 also includes additional information such an indicator 608 of scan progress (e.g., whether a respective machine has finished evaluating the rule/quick search).

FIG. 6B provides an example of a second quick search report 620, which is sent by a respective machine to a respective server or an external machine (e.g., an external server 110) via a direct duplex connection. Second quick search report 620 includes file identifying information 622 identifying files at the respective machine that contain file content satisfying the quick search. In some embodiments, the second report further includes, for each file identified in the second report, a count of content 624 that satisfies the rule/quick search (e.g., the number of distinct instances, in each identified file, of the text string specified by the quick search). In some embodiments, the second report further includes file metadata 626 for each identified file, such as the file metadata 526 described above with reference to FIG. 5B.

FIG. 6C provides an example of a third quick search report 640, which is sent by a respective endpoint machine to a respective server or an external machine (e.g., an external server) via a direct duplex connection. Third quick search report includes file snippets 642 identified as containing file content satisfying the rule/quick search (e.g., content that includes the text string specified by the quick search). In some embodiments, third quick search report 640 also includes the location of each snippet 644.

FIG. 6D provides an example of a first report 650 for a similarity search query, which is sent by a respective endpoint machine to a respective server or an external machine (e.g., an external server) via a linear communication orbit. In some embodiments, the first report 650 for a similarity search query 650 identifies, for each machine 652 from which similarity search results are received, one or more counts of files 654 that contain file content satisfying one or more similarity score threshold values (e.g., 70 percent, 80 percent and 90 percent). In some embodiments, the first report 502 also includes additional information such an indicator 656 of scan progress (e.g., whether a respective machine has finished evaluating the similarity search query).

FIG. 6E provides an example of a second report 660 for a similarity search query, which is sent by a respective endpoint machine to a respective server or an external machine (e.g., an external server) via a linear communication orbit. In some embodiments, the second report 660 for a similarity search query includes file identifiers 662 of files that satisfy at respective similarity score threshold (e.g., 70 percent), and for each identified file, a similarity score 664, and optionally includes file metadata, such as the file metadata 526 described above with reference to FIG. 5B.

FIG. 7 is a block diagram of an exemplary endpoint machine 102 as shown in FIGS. 1A and 1B. In some embodiments, endpoint machine 102 includes one or more processors 702, memory (e.g., persistent memory 703 and non-persistent memory 704) for storing programs and instructions for execution by the one or more processors 702, one or more communications interfaces such as input/output interface 706 and network interface 708, and one or more communications buses 710 for interconnecting these components.

In some embodiments, input/output interface 706 includes a display and input devices such as a keyboard, a mouse, or a track-pad. However, in some embodiments, endpoint machine 102 does not include an input/output interface 706. In some embodiments, communication buses 710 include circuitry (sometimes called a chipset) that interconnects and controls communications between system components. In some embodiments, non-persistent memory 704 includes high-speed random-access memory, such as DRAM, SRAM, DDR RAM or other random-access solid-state memory devices. In some embodiments, persistent memory 703 includes CD-ROM, digital versatile disks (DVD) or other optical storage, magnetic cassettes, magnetic tape, magnetic disk storage or other magnetic storage devices, magnetic disk storage devices, optical disk storage devices, flash memory devices, or other non-volatile solid-state storage devices. In some embodiments, persistent memory 703 optionally includes one or more storage devices remotely located from the one or more processors 702. In some embodiments, persistent memory 703 and/or the non-volatile memory device(s) within the non-persistent memory 704 comprises a non-transitory computer readable storage medium.

In some embodiments, memory 704 or alternatively the non-transitory computer readable storage medium stores the following programs, modules and data structures, instructions, or a subset thereof:

- Operating System 712 that includes procedures for handling various basic system services and for performing hardware dependent tasks.
- Optionally, I/O module 714 that includes procedures for handling various basic input and output functions through one or more input and output devices.
- Communication module 716, which includes:
  - LCO communications module 718 that includes instructions for (1) connecting machine 102 to other machines (e.g., other machines 102 in network 100) in the same linear communication orbit 106 (FIGS. 1A, 1B) as machine 102, and (2) handling receipt, processing, propagation, collection and reporting of system, security and network management messages and commands, and/or distribution of files and software updates via the linear communication orbit.
  - Direct connection module 720 that includes instructions to establish a direct full duplex connection with an external machine, such as server 110, in response to an instruction packet received by machine 102 via the linear communication orbit.
  - Non-LCO communications module 722 that includes instructions for connecting machine 102 to servers (e.g., server 108) via one or more network communication interfaces 708 (wired or wireless) and one or more communication networks, such as the Internet, other wide area networks, local area networks, metropolitan area networks, and so on.
- Orbit formation and maintenance module 724 that includes instructions to self-insert machine 102 into a linear communication orbit, self-heal from a broken link in the linear communication orbit, and maintain the linear communication orbit for network and system management.
- Query/Command and Response Module 726 that includes instructions for processing data requests and other commands received from a preceding machine, succeeding machine, server, or other external machine.
- Local rules database 728 (e.g., corresponding to local database 202, shown in FIG. 2) that includes a local copy of each of the rules sent to endpoint machine 102 by a respective server, and includes rule evaluation results generated by rule evaluation module 732, as discussed above with reference to FIG. 2.
- Rule evaluation module 732 that includes instructions or submodules for rule evaluation 734, for generating a first report 736 regarding files that satisfy each of the rules, a second report 738 files that satisfy each of the rules, and a third report 740 regarding hits within a file that satisfies a respective rules in the set of rules, and any subsequent reports regarding files that satisfy respective rules in the set of rules.
- Reverse index 744 (e.g., corresponding to reverse index 302, shown in FIG. 3A) that provides a lookup table for identifying files that contain text matching the text specified by a rule or search query, as discussed above with reference to FIG. 3A.
- Reverse index module 746 that includes instructions generating and updating reverse index 744 as files are added, removed and updated at the endpoint machine 102, as well as instructions for searching and extracting information from reverse index 744.
- Quick search module 748 that includes instructions for performing a quick-search of files stored at the endpoint machine 102 (e.g., to produce reports as shown in FIGS. 6A-6C).
- Background processing module 750 that includes instructions for performing rule evaluation (using rule evaluation module 732) as a background task or process, and generating and updating reverse index 744 (using reverse index module 746) as a background task or process. These background tasks or processes are executed while endpoint machine 102 continues to perform its primary functions (execution of other modules 756).
- Snippet report module 752 that includes instructions for sending one or more snippets (e.g., file content satisfying a respective rule in the set of one or more rules) to a server or external machine through a direct duplex connection.
- Local data 754 such as messages, locally stored files 756 (e.g., as shown in FIGS. 4A and 4B), reports (e.g., as shown in FIGS. 5A-5C and 6A-6C), and/or other information (e.g., file identifying information) that is stored locally (e.g., in a local database of machine 102), temporarily or otherwise; in some embodiments or circumstances, portions of local data 754 is stored upon receipt from a preceding machine, succeeding machine, server, or external machine; in some embodiments or circumstances, portions of local data 754 is locally generated, revised or supplemented by machine 102; and in some embodiments or circumstances, portions of local data 754 is transmitted by machine to a preceding machine, succeeding machine, server, or external machine.
- Similarity search module (client) 760 that includes instructions or submodules for identifying files stored on the endpoint machine that satisfy one or more similarity threshold values. In some embodiments, the one or more similarity threshold values are predefined (e.g., specified by instructions within the similarity search module 760), while in other embodiments, or in some circumstances, the similarity threshold values are specified by a similarity search received by the endpoint machine. In some embodiments, the similarity search module 760 computes similarity scores based on the vector of term and TF or TFIDF values in a specified similarity search query (e.g., similarity search query 320, FIG. 3B)

Local or global dictionary 762, corresponding to local dictionary 330, shown in FIG. 3C or global dictionary 340, shown in FIG. 3D. Local or global dictionary 762 includes entries 764, such as token-IDF value pairs, that specify IDF values for the terms represented by those entries, as further described above with reference to FIGS. 3C and 3D.

Clustering module (client) 770 that includes instructions or submodules for clustering files stored on the endpoint machine. In some embodiments, the contents of locally stored files 756 to be clustered are each represented by file vectors 758, as described above. The files are clustered based on the vectors representing the content of the files, with the TFIDF values being used to weight the terms in each file.

Classifier module (client) 780 that includes instructions or submodules for classifying locally stored files 756, locally stored on the endpoint machine. In some embodiments, the contents of locally stored files to be classified are each represented by file vectors 758, as described above. The files are assigned classifier labels based on the vectors representing the content of the files, with the TFIDF values being used to weight the terms in each file.

Optionally, other modules 790 that include instructions for handling other functions and aspects described herein, such as creation and maintenance of local event logs and performing IOC evaluations based on local state.

Figure 7A:
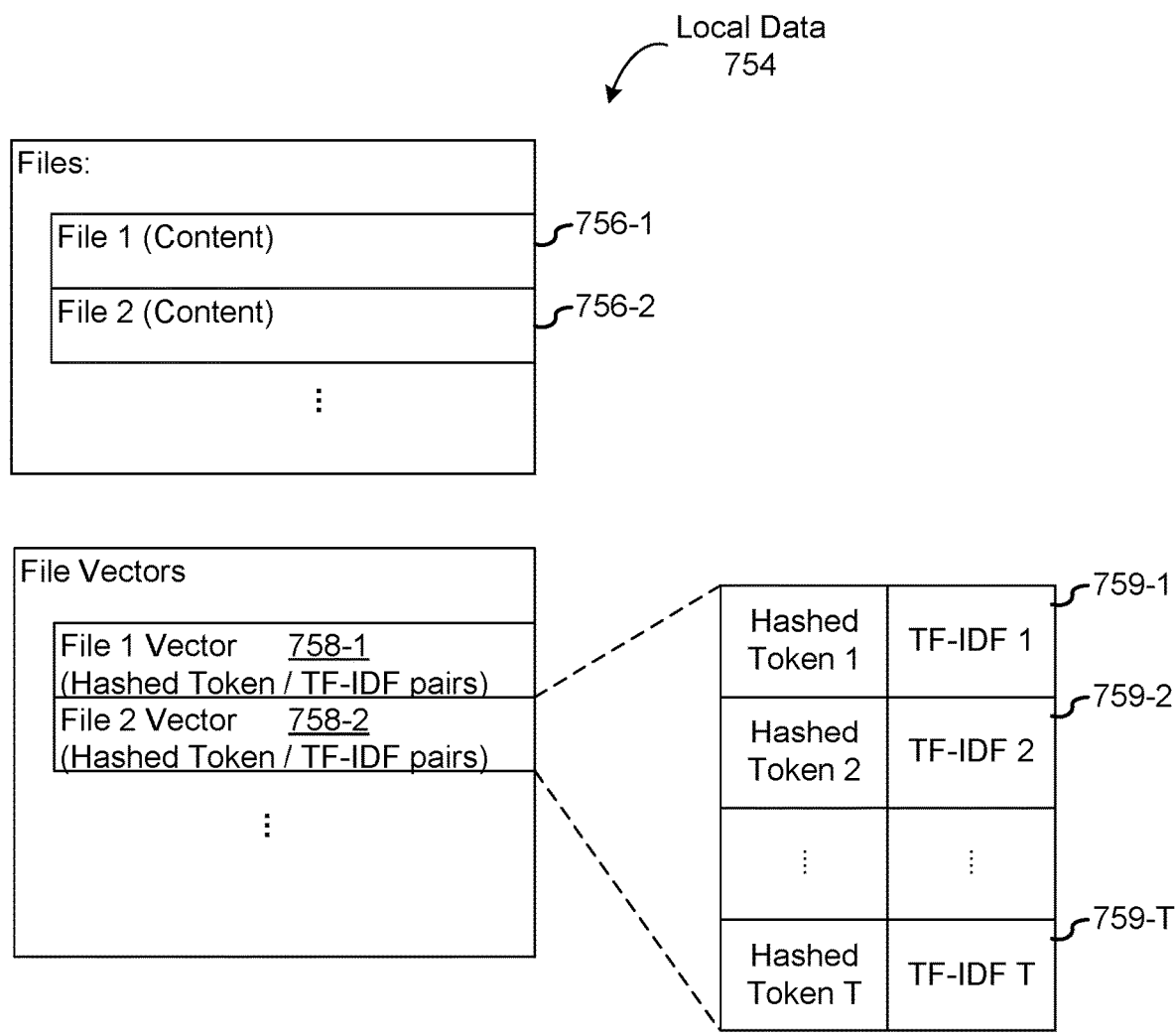

In some embodiments, as shown in FIG. 7A, local data 754 includes file vectors 758, each of which represents content in a respective file of the locally stored files 756 (e.g., file 756-1, file 756-2, etc.). More specifically, each locally stored file 756 that is a candidate for identification by similarity search module 760, for clustering by clustering module 770, or for classification by classification module 780, is represented by a file vector 758 (e.g., 758-1, 758-2, etc.) that includes a set of term-TFIDF value pairs 759 (e.g., T pairs, 759-1 to 759-T, where T is an integer greater than 1) (e.g., similar in structure to what is shown in FIG. 3B for a similarity search query 320), which specify a set of terms in the file, and TFIDF values (or, alternatively, TF values) for those terms, as shown in FIG. 7A. As shown in FIG. 7A, in some embodiments, each term-TFIDF value pair 759 includes a hashed token value, identifying a respective token or term, and a TFIDF value for the term identified token or term. In some embodiments, for each file, the number, T, of term-TFIDF value pairs 759 in the corresponding file vector 758 is the number of distinct terms found in the file represented by the file vector 758; in some other embodiments, for each file, T is the smaller of (A) the number of distinct terms found in the file represented by the file vector, and (B) a predefined number (e.g., 50, 100, or the like), which is typically greater than or equal to 50.

In some embodiments, the file vectors 758 include term-TF (term frequency) value pairs instead of term-TFIDF value pairs, where the TF value in a respective term-TF value pair is the number of occurrences of the corresponding term in the file represented by the file vector. In such embodiments, the IDF values for the terms in each file are obtained from a local or global dictionary, and TFIDF values for the terms in the file are computed by combining the TF values in the file vector with their corresponding IDF values.

In some embodiments, background processing module 750, working with reverse index module 746, generates and updates file vectors 758 while generating and updating reverse index 744. For example, in response to detecting the creation of new files at a respective endpoint machine, background processing module 750 and reverse index module 746 of the respective endpoint machine add entries for those files to that endpoint machines' reverse index 744, and also generate a file vector 758 for each such file. Similarly, after the content of a respective file is updated, background processing module 750 and reverse index module 746 of the endpoint machine at which the updated file is located update the reverse index 744 to reflect the changed content of the respective file, and furthermore either generate a new file vector 758 for that file, or it update an existing file vector 758 for the file.

FIG. 7 is merely illustrative of the structures of endpoint machines 102. A person skilled in the art would recognize that particular embodiments of endpoint machines 102 may include more or fewer components than those shown. One or more modules may be divided into sub-modules, and/or one or more functions may be provided by different modules than those shown.

FIG. 8 is a block diagram of an exemplary computer system 108, sometimes called server 108, or server system 108 (e.g., server 108 of the networks shown in FIGS. 1A and 1B). In some embodiments, server 108 includes one or more processors 802, memory (e.g., persistent memory 803 and non-persistent memory 804) for storing programs and instructions for execution by one or more processors 802, one or more communications interfaces such as input/output interface 806 and network interface 808, and one or more communications buses 810 for interconnecting these components. In some embodiments, the one or more communication interfaces couple server 108 to, and enable communications with machines in a non-static collection of machines (e.g., machines 102, FIGS. 1A and 1B). More specifically, in some embodiments, the one or more communication interfaces, such as network interface 408, couple server 108 to one or more linear communication orbits (e.g., LCOs 106, FIGS. 1A and 1B).

In some embodiments, input/output interface 806 includes a display and input devices such as a keyboard, a mouse, or a track-pad. However, in some embodiments, server system 108 does not include an input/output interface 806. In some embodiments, communication buses 810 include circuitry (sometimes called a chipset) that interconnects and controls communications between system components. In some embodiments, non-persistent memory 804 includes high-speed random access memory, such as DRAM, SRAM, DDR RAM or other random access solid state memory devices. In some embodiments, persistent memory 803 includes CD-ROM, digital versatile disks (DVD) or other optical storage, magnetic cassettes, magnetic tape, magnetic disk storage or other magnetic storage devices, magnetic disk storage devices, optical disk storage devices, flash memory devices, or other non-volatile solid state storage devices. In some embodiments, persistent memory 803 optionally includes one or more storage devices remotely located from the one or more processors 802. In some embodiments, persistent memory 803 and/or the non-volatile memory device(s) within the non-persistent memory 804 comprises a non-transitory computer readable storage medium.

In some embodiments, memory 804, or alternatively the non-transitory computer readable storage medium, stores the following programs, modules, data structures, instructions, or a subset thereof:

- Operating System 812 that includes procedures for handling various basic system services and for performing hardware dependent tasks.
- Optionally, I/O module 814 that includes procedures for handling various basic input and output functions through one or more input and output devices.
- Communication module 816, which comprises:
  - LCO communications module 818 that includes instructions for (1) connecting server 108 to other machines (e.g., other machines 102 in network 100) in one or more linear communication orbits 106 (FIGS. 1A, 1B) connected to and serviced by server 108, (2) handling receipt, processing, propagation, collection and reporting of system, security and network management messages and commands via the one or more linear communication orbits connected to and serviced by server 108, and/or distribution of files and software updates.
  - Direct connection module 820 that includes instructions for sending an instruction packet to a specified machine 102 on a linear communication orbit, instructing that machine 102 to initiate an outbound connection to an external machine (e.g., server 108 or server 110), establishing a direct full duplex connection between the specified machine 102 and the external machine, which can then be used by the external machine to inspect and update machine 102.
  - Non-LCO communications module 822 that includes instructions for connecting server 108 to other machines, such as other servers 108 or 110, administrator machine(s) 116, etc., via one or more network communication interfaces 408 (wired or wireless) and one or more communication networks, such as the Internet, other wide area networks, local area networks, metropolitan area networks, and so on.
- Orbit formation and maintenance module 824 that includes instructions to determine and provide ordinal positions of machines 102 in an ordered sequence of a set of managed machines currently known to be coupled to network 100; and optionally includes instructions for a machine to self-insert into a linear communication orbit, self-heal from a broken link in the linear communication orbit, and maintain the linear communication orbit for network and system management.
- Query/Command and response module 826 that includes instructions for sending rules and queries to one or more machines in one or more linear communication orbits, retrieving results and query responses, and sending said results and responses to an analysis module, such as analysis module 840, discussed below. In some embodiments, query/command and response module 826 provides a user interface for a network or system administrator to directly perform various system and network functions, such as sending out rules and/or queries.
- Rule authoring module 828 that includes instructions for composing rules, including rule components such as primary rules (e.g., regular expressions), validation rules, and optionally executable code (e.g., executable code 214, shown in FIG. 2). In some embodiments, rule authoring module 828 provides a user interface for a network or system administrator to directly determine rule contents.
- Rules 830 (e.g., a local copy of the set of one or more rules), that includes each rule (e.g., rules 832-1, 832-2, 832-M, etc.) propagated from a network server and/or an external machine through a linear communication network.
- Quick search module 834 that includes instructions for initiating a quick-search of files at one or more endpoint machines in one or more linear communication orbits (e.g., to procure the reports shown in FIGS. 6A-6C). In some embodiments, quick search module 834 provides a user interface for a network or system administrator to directly perform quick searches.
- Aggregated report generation module 836 that includes instructions for collecting and compiling one or more first reports, one or more second reports, and/or one or more query responses from one or more machines in one or more linear communication orbits (e.g., collecting data from one or more linear communication orbits).
- Snippet report module 838 that includes instructions for collecting one or more snippets (e.g., file content satisfying a respective rule in the set of one or more rules) from a machine 102 through a direct duplex connection.
- Analysis module 840 that includes instructions for analyzing raw data items collected from one or more linear communication orbits, organizing the raw data items and/or derived data items (i.e., result data from the analysis), and storing result data from the analysis of the collected raw data items in local data 842.
- Local data 842 such as messages, files, reports and/or other information (e.g., for storing result data that has been analyzed after transmission from machines in one or more linear communication orbits) that is stored, temporarily or otherwise, upon receipt from other machines, and/or that is locally generated, revised, or supplemented.
- Global dictionary generation and update module 850 that includes instructions or submodules for maintaining and updating a global dictionary 852, an example of which is described above with reference to FIG. 3D, and for distributing global dictionary 852 to a set of endpoint machines 102. Operation of global dictionary generation and update module 850 is described below with reference to FIG. 11. Global dictionary generation and update module 850 is optional and is not included in embodiments in which local IDF values are used by endpoint machines 102 when evaluating similarity search queries, performing file clustering using file clustering module 770, or performing file classification using classifier module 780.
- Global dictionary 852, an example of which is shown as global dictionary 340 in FIG. 3D, is generated and produced by Global dictionary generation and update module 850. In some embodiments, global dictionary 852 includes a plurality of term-IDF pairs 854, each term-IDF pair 854 identifying a term (e.g., with a hashed-token value) and including a corresponding IDF value for that term, representing the importance of that term in a global corpus of documents.
- Similarity search module (server) 860 that includes instructions or submodules for sending similarity search queries to endpoint machines and receiving the search results produced by the endpoint machines, where sending a similarity search query, such as similarity search query 320 shown in FIG. 3B to a set of endpoint machines, causes the endpoint machines to identify locally stored files that have similarity scores, with respect to a target file (a target file whose content corresponds to the similarity search query), that satisfy one or more similarity threshold values. In some embodiments, the similarity search queries are generated by similarity search module (server) 850, while in other embodiments the similarity search queries are generated by a similarity search module (adm) 950 on an administrator machine 116.

File clustering module 870 that includes instructions or submodules for sending data clustering instructions to endpoint machines, such as the endpoint machines on one or more linear communication orbits, for generating clusters of files stored at the endpoint machines, and receiving, aggregating and reporting (e.g., to a user of an administrator machine 116) the results of the file clustering operations performed at the endpoint machines.

File classifier module 880 that includes instructions or submodules (e.g., classifier model 1-k) for sending data classification instructions to endpoint machines, such as the endpoint machines on one or more linear communication orbits, for classifying files stored at the endpoint machines, and receiving, aggregating and reporting (e.g., to a user of an administrator machine 116) the results of the file classification operations performed at the endpoint machines.

Optionally, other modules 890, including function modules, that include instructions for handling other functions and aspects described herein, such as creation and maintenance of local event logs and performing IOC evaluations based on local state.

FIG. 8 is merely illustrative of the structures of server 108 or 110. A person skilled in the art would recognize that particular embodiments of server 108, for example, may include more or fewer components than those shown. One or more modules may be divided into sub-modules, and/or one or more functions may be provided by different modules than those shown.

FIG. 9 is a block diagram of an exemplary computer system 116, such as an administrator machine of the network shown in FIG. 1. In some embodiments, administrator machine 116 includes one or more processors 902, memory (e.g., persistent memory 903 and non-persistent memory 904) for storing programs and instructions for execution by one or more processors 902, one or more communications interfaces such as input/output interface 906 and network interface 908, and one or more communications buses 910 for interconnecting these components.

In some embodiments, input/output interface 906 includes a display and input devices such as a keyboard, a mouse, or a track-pad. However, in some embodiments, administrator machine 116 does not include an input/output interface 906. In some embodiments, communication buses 910 include circuitry (sometimes called a chipset) that interconnects and controls communications between system components. In some embodiments, non-persistent memory 904 includes high-speed random access memory, such as DRAM, SRAM, DDR RAM or other random access solid state memory devices. In some embodiments, persistent memory 903 includes CD-ROM, digital versatile disks (DVD) or other optical storage, magnetic cassettes, magnetic tape, magnetic disk storage or other magnetic storage devices, magnetic disk storage devices, optical disk storage devices, flash memory devices, or other non-volatile solid state storage devices. In some embodiments, persistent memory 903 optionally includes one or more storage devices remotely located from the one or more processors 902. In some embodiments, persistent memory 903 and/or the non-volatile memory device(s) within the non-persistent memory 904, comprises non-transitory computer readable storage medium.

In some embodiments, memory 904, or alternatively the non-transitory computer readable storage medium, stores the following programs, modules, data structures, instructions, or a subset thereof:

Operating System 912 that includes procedures for handling various basic system services of administrator machine 116 and for performing hardware dependent tasks.

Optionally, I/O module 914 that includes procedures for handling various basic input and output functions through one or more input and output devices.

Communication module 916, which comprises:
Direct connection module 920 that includes instructions for sending an instruction packet, via a server 108, to an endpoint machine 108, instructing the endpoint machine to initiate an outbound connection to administrator machine 116 (or another external machine such as server 110), establishing a direct full duplex connection with administrator machine 116 or other external machine.

Non-LCO communications module 922 that includes instructions for handling communications between administrator machine 116 and other machines, such as server 108, via one or more network communication interfaces 908 (wired or wireless) and one or more communication networks, such as the Internet, other wide area networks, local area networks, metropolitan area networks, and so on.

Query/Command and response module 926 that includes instructions for sending rules and queries to one or more machines in one or more linear communication orbits, retrieving results and query responses, and sending said results and responses to analysis module 940. In some embodiments, query/command and response module 926 provides a user interface for a network or system administrator to directly perform various system and network functions, such as sending out rules and/or queries.

Rule authoring module 928 that includes instructions for composing rules, including rule components such as primary rules (e.g., regular expressions), optionally validation rules, and optionally executable code (e.g., as shown in FIG. 2). In some embodiments, rule authoring module 928 provides a user interface for a network or system administrator to directly determine rule contents.

Rules 930 (e.g., a local copy of the set of one or more rules), that includes each rule (e.g., rules 932-1, . . . 932-M, etc.) propagated from a network server and/or an external machine through a linear communication network.

Quick search module 934 that includes instructions for performing a quick-search of files at one or more endpoint machines in one or more linear communication orbits (e.g., to procure the reports shown in FIGS. 6A-6C). In some embodiments, quick search module 934 provides a user interface for a network or system administrator to directly perform quick searches.

Aggregated report generation module 936 that includes instructions for collecting and compiling one or more first reports, one or more second reports, and/or one or more query responses from one or more machines in one or more linear communication orbits (e.g., collecting data from one or more linear communication orbits).

Snippet report module 938 that includes instructions for collecting one or more snippets (e.g., file content satisfying a respective rule in the set of one or more rules) from a machine 102 through a direct duplex connection.

Analysis module 940 that includes instructions for analyzing raw data items collected from one or more linear communication orbits, organizing the raw data items and/or derived data items (i.e., result data from the analysis), and storing result data from the analysis of the collected raw data items in local data 942.

Local data 942 such as messages, files, reports and/or other information (e.g., for storing result data that has been analyzed after transmission from machines in one or more linear communication orbits) that is stored, temporarily or otherwise, upon receipt from other machines, and/or that is locally generated, revised, or supplemented.

Global dictionary generation and update module 950 that includes instructions or submodules for maintaining and updating a global dictionary 952, an example of which is described above with reference to FIG. 3D, and for distributing global dictionary 952 to a set of endpoint machines 102. Global dictionary generation and update module 950 is similar to global dictionary generation and update module 850 (FIG. 8) but located at administrator machine 116 instead of server 108 or 110, and thus the description of global dictionary generation and update module 850 provided herein is also applicable to global dictionary generation and update module 950. In some embodiments, a global dictionary generation and update module 850 or 950 is provided at either a set of servers 108/110 or at one or more administrator machines 116, but not both.

Global dictionary 952, an example of which is shown as global dictionary 340 in FIG. 3D, is generated and produced by Global dictionary generation and update module 952. In some embodiments, global dictionary 952 includes a plurality of term-IDF pairs 954, each term-IDF pair 954 identifying a term (e.g., with a hashed-token value) and including a corresponding IDF value for that term, representing the importance of that term in a global corpus of documents.

Global dictionary report module 958 that includes instructions or submodules for generating reports regarding completeness and other characteristics of the global dictionary 954 and displaying user interfaces to present the results of the global dictionary to human analysts.

Similarity search module (admin) 960 that includes instructions or submodules for generating similarity search queries, sending generated queries to endpoint machines, and receiving the search results produced by the endpoint machines. Similarity search module 960 is similar to similarity search module 860 (FIG. 8) but located at and executed by administrator machine 116 instead of server 108 or 110, and thus the description of similarity search module 860 provided herein also applicable to similarity search module 960. In some embodiments, a server-side similarity search module 860 or 960 is provided at either a set of servers 108/110 or at one or more administrator machines 116, but not both.

File clustering module (adm) 970 that includes instructions or submodules for aggregating and reporting the results of local file clustering by clustering modules 770 at a set of endpoint machine 102. Optionally, file clustering report module 970 includes instructions or submodules for obtaining additional file clustering information from a respective endpoint machine 102 using a direct connection to the respective endpoint machine.

File classifier report module (adm) 980 that includes instructions or submodules for aggregating and reporting the results produced by classifier modules 780 at a set of endpoint machines. Optionally, file classifier report module 980 includes instructions or submodules for obtaining additional file classification information from a respective endpoint machine 102 using a direct connection to the respective endpoint machine.

Optionally, other modules 990, including function modules, that include instructions for handling other functions and aspects described herein, such as creation and maintenance of local event logs, and aggregating and reporting on information, such as module and machine performance evaluations generated locally at a set of endpoint machines, received by the administrator machine 116.

FIG. 9 is merely illustrative of the structures of server 108 or 110. A person skilled in the art would recognize that particular embodiments of server 108, for example, may include more or fewer components than those shown. One or more modules may be divided into sub-modules, and/or one or more functions may be provided by different modules than those shown.

Figure 10:
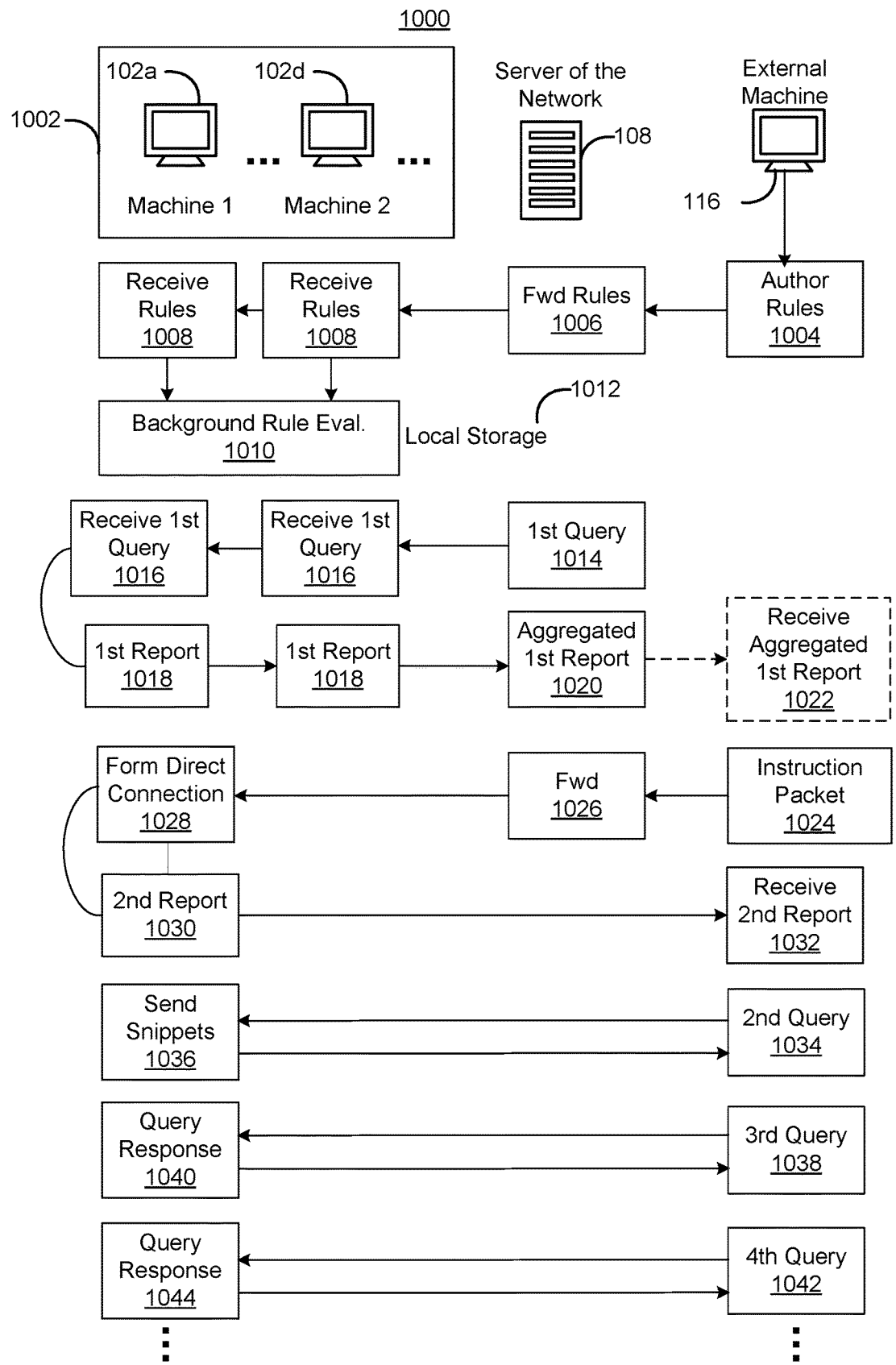
FIG. 10 is a flow chart of a method of report generation and transmission (e.g., by an exemplary endpoint machine) to a requesting server or other external machine, in accordance with some embodiments.

FIG. 10 illustrates a flow diagram of a method 1000 of monitoring a network that includes a non-static collection of machines. The non-static collection of machines includes a linear communication orbit. In some embodiments, before the method is performed, a set of one or more rules are authored (1004) and forwarded (1006) to at least some of the machines 1002 in the non-static collection of machines. In some embodiments, the set of one or more rules are authored at a machine external to the linear communication orbit (e.g., administrator machine 116 or external server 110) and forwarded by a server of the network (e.g., server 108) to respective machines in the collection of machines. In some embodiments, the set of one or more rules are both authored and forwarded to the collection of machines by a server, such as server 108 (FIGS. 1A, 1B) of the network. Each endpoint machine (e.g., 102*a*, 102*d*, etc.) in the collection of machines receives (1008) the set of one or more rules and performs a background evaluation of the rules in the set of one or more rules (1010). In some embodiments, the background rule evaluation occurs as described above with reference to background processing module 750 (FIG. 7), and the results for the background rule evaluation at each machine are stored in a local database 1012 at the respective machine.

At a first time, a respective machine 102*a* in the collection of machines 1002 receives (1016) a first query through the linear communication orbit, wherein the first query has been propagated (1014) from a respective server (e.g., the Tanium server 108) to the respective machine though one or more upstream machines (e.g., machines that are upstream of the respective machine 102*a*) along the linear communication orbit. The first query includes the set of one or more rules.

In some embodiments, the first query includes a subset of the set of one or more rules. Typically, the first query is received (at the first time) after the set of one or more rules has been forwarded (1006) to the respective machine 102a, and the respective machine 102a has evaluated the one or more rules (1010).

In response to receiving the first query, the respective machine, for each respective rule in the set of one or more rules, identifies files (if any) that contain file content that satisfies the respective rule. Subsequent to receiving the first query, the respective machine generates (1018) a first report identifying, for each rule in the set of one or more rules, a count of files at the respective machine that contain file content satisfying the rule, and sends (1020) the first report through the linear communication orbit to the respective server via an end machine (e.g., at an end machine) of the linear communication orbit.

In some embodiments, the respective machine sends the first report by adding the first report to a payload portion of the first query, and then forwarding the first query to a next downstream machine in the same linear communication orbit 1002 as the respective machine. In some embodiments, the end machine aggregates all the first reports from machines in the linear communication orbit 1002, and sends that aggregated report to the respective server. In some embodiments, the respective server itself aggregates the first reports from the machines in the linear communication orbit. In some embodiments, the respective server forwards (1022) the aggregated report to an external machine, such as external machine 116. As described above with respect to FIG. 2, in some embodiments the information included in the first report is computed by the respective machine, and stored in a local database 202 of the respective machine, using background processing, prior to receiving the first query.

At a second time, subsequent to the first time, the respective machine receives (1028) from an external machine, external to the linear communication orbit, an instruction packet 1024 (e.g., corresponding to instruction packet 122 in FIG. 1B) via the linear communication orbit. In some embodiments, the external machine is the respective server. The instruction packet 1024 is propagated (1026, e.g., forwarded by server 108) to the respective machine through one or more upstream machines along the linear communication orbit. In some embodiments, the instruction packet includes an instruction for establishing a direct duplex connection between the respective machine and the external machine. In response to receiving the instruction packet through the linear communication orbit, the respective machine forms the direct duplex connection by sending an outbound connection request to the external machine to establish the direct duplex connection between the respective machine and the external machine in accordance with a respective network connection protocol.

After the direct duplex connection has been established, the respective machine sends (1030) a second report (e.g., 502 in FIG. 5A or 602 in FIG. 6A) to the external machine via the direct duplex connection. In some embodiments, the second report is sent by the respective machine in response to a query (not shown) sent by the external machine via the direct duplex connection. The second report includes, as described in FIGS. 5B and 6B, file identifying information identifying files at the respective machine that contain file content satisfying each rule in the set of one or more rules. In some embodiments, the second report further includes, for each file identified in the second report, a count of content portions that satisfy a respective rule in the set of one or more rules. As described above with respect to FIG. 2, in some embodiments the information included in the second report is computed by the respective machine, and stored in a local database 202 of the respective machine using background processing, prior to receiving a query for the second report.

The respective machine receives (1034), at a third time subsequent to the second time, a second query through the direct duplex connection from the external machine. The second query includes one or more requests for snippets of information from a respective file identified as containing file content satisfying a respective rule in the set of one or more rules. In response to receiving the second query, the respective machine sends (1036) to the external machine via the duplex direct connection a third report including one or more snippets corresponding to file content in the respective file that contributes to satisfaction of the respective rule (e.g., as described in FIGS. 5C and 6C). In some embodiments, for each snippet included in the third report, context information, comprising text adjacent the snippet, preceding and/or following the snippet in the file, is included along with the text of the snippet.

In some embodiments, the third report includes snippet information identifying, for the respective file (e.g., for each file), locations in the respective file corresponding to the file content that contributes to satisfaction of the respective rule, as well as the snippets of file content. In some embodiments, the locations in the respective file corresponding to the file content that contributes to satisfaction of the respective rule are determined by the endpoint machine during background process, and are stored in a local database (see local database 202, FIG. 2) along with other results of evaluating the one or more rules in the set of rules, as described above with reference to FIG. 2.

In some embodiments, the direct duplex connection used for the second and third reports is an encrypted communication connection in which information sent by the respective machine to the external machine is encrypted. (e.g., to protect confidential information).

With regard to quick searches (e.g., as described with regard to FIGS. 6A-6C), variations in the reports are described below. The first query includes a single rule, the single rule specifying a string, represented by a sequence of hashed tokens, each hashed token corresponding to a predefined unit of text. Each of the hashed tokens comprises a result of applying a predefined one-way hash function to a corresponding token. The first report includes information corresponding to a count of files at the respective machine that contain file content matching the string specified by the single rule. In some embodiments, identifying files that contain file content that satisfies the single rule includes performing lookups, in a reverse lookup table (e.g., as shown in FIG. 3A), of the hashed tokens in the sequence of hashed tokens, to identify files having content matching units of text in the string specified by the single rule. Further discussion of identifying files matching a quick search is provided above with reference to FIGS. 3A and 6A-6C.

In some embodiments, as shown in FIG. 2, each rule in the set of one or more rules includes a primary rule, and a respective rule in the set of one or more rules includes one or more validation rules that are logically combined with the primary rule of the respective rule to determine whether respective file content (e.g., one or more hits in the respective file) satisfies the respective rule.

In some embodiments, the primary rule of each rule in the set of one or more rules corresponds to a respective regular expression (e.g. a content pattern). In some embodiments, each validation rule in the set of one or more validation rules corresponds to a respective second regular expression.

Each rule optionally includes validation rules (e.g., validation rules 216 in FIG. 2), and each validation rule can be either a positive or negative validation rule, for confirming and negating the applicability of a rule to a particular content item in a file. Thus, some rules may include one or more validation rules, while one or more rules may include no validation rules.

In some embodiments, the one or more validation rules of a respective rule include one or more positive validation rules. In some embodiments, determining whether a respective file satisfies the respective rule includes determining a number of hits in the respective file. When a respective rule includes one or more positive validation rules, each hit corresponds to file content in the respective file that satisfies both the primary rule of the respective rule and at least one positive validation rule of the respective rule. Stated another way, in some embodiments, determining whether a respective file satisfies the respective rule includes determining whether file content within the respective file satisfies at least one positive validation rule in the one or more positive validation rules.

In some embodiments, the one or more validation rules of the respective rule include one or more negative validation rules. In some embodiments, determining whether a respective file satisfies the respective rule includes determining a number of hits in the respective file. When a respective rule includes one or more negative validation rules, each hit corresponds to file content in the respective file that satisfies the primary rule of the respective rule and does not satisfy any negative validation rule in the one or more negative validation rules of the respective rule. Stated another way, in some embodiments, the method includes determining whether a respective file does not satisfy the respective rule, including determining whether file content within the respective file satisfies at least one negative validation rule in the one or more negative validation rules.

In some embodiments, positive validation rules have higher priority, or outrank, negative validation rules. As a result, if a particular rule includes both positive and negative validation rules, and a candidate content item satisfies the primary rule, a positive validation rule and a negative validation rule of the particular rule, the candidate content item is a hit, because it satisfies at least one positive validation rule of the particular rule.

In some other embodiments, negative validation rules have higher priority, or outrank, positive validation rules. As a result, if a particular rule includes both positive and negative validation rules, and a candidate content item satisfies the primary rule, a positive validation rule and a negative validation rule of the particular rule, the candidate content item is not a hit, because it satisfies at least one negative validation rule of the particular rule.

In some embodiments, as shown in FIG. 2 a first report 220 (also 502 in FIG. 5A or 602 in FIG. 6A) is stored in a local database 202 of the respective machine prior to receiving the first query. In some embodiments, the second report 224 in FIG. 2, 520 in FIG. 5B, or 620 in FIG. 6B, is stored in the local database of the respective machine prior to receiving the second query. In some embodiments, the results in first report and second report are computed by a background process, based on the set of rules.

In some embodiments, a respective rule in the set of one or more rules includes executable instructions (e.g., 214 in FIG. 2), or a reference to executable instructions, for determining if content matching the regular expression of the corresponding primary rule satisfies additional criteria required for satisfying the respective rule. In some embodiments, one or more rules in the set of one of more rules includes executable instructions, or a reference (e.g., a link or procedure call) to executable instructions, for determining if content matching the regular expression of the corresponding primary rule satisfies additional criteria required for satisfying the rule. In some embodiments, optionally, the executable code is part of the primary rule and is evaluated as part of evaluation of the primary rule, or alternatively, is evaluated only after all other portions of the rule are evaluated (e.g., including any validation rules present in the respective rule). In one example, the executable instructions determine whether a number (e.g., in the content of a file) is a valid credit card number.

In some embodiments, the external machine sends 1038 a third query to the respective machine, where the third query includes an updated version of at least one rule in the set of one or more rules. In some embodiments, updated rules are treated like new rules, and are evaluated, in the background, against all applicable files as described above for the original set of one or more rules. The respective machine returns 1040 (or 1044) a query response, either in response to the third query (1038) or a subsequent query (e.g., a fourth query 1042), in the form of a first report, second report, and/or third report, each of which is described above.

FIG. 11 illustrates a flow diagram of a method 1100 of performing a distributed similarity search on a network that includes a non-static collection of machines. The non-static collection of machines includes a linear communication orbit. In some embodiments, before method 1100 is performed, and a similarity search query is authored 1104 and forwarded 1105 to at least some of the endpoint machines 1002 in the non-static collection of machine, each endpoint machine 1002 generates a reverse index 744 for locally stored files 756, and also generates file vectors 758 for those files, as described above with reference to FIGS. 7 and 7A. Furthermore, each endpoint machine 1002 continues to update its reverse index 744 and set of file vectors 758 as files are created, updated and deleted. In addition, prior to receiving a similarity search query, each endpoint machine 1002 either generates a local dictionary, mapping terms (e.g., represented by hashed token values) to IDF values, or receives a global dictionary, which maps terms (e.g., represented by hashed token values) to IDF values. As a result, prior to receiving a similarity search query, the endpoint machines have the information needed to quickly generate similarity scores that represent the degree of similarity between the target document (also herein called the target file) represented by the similarity search query and each locally stored file in a set of locally stored files.

In some embodiments, to generate a global dictionary of term-IDF values (e.g., as described above with respect to FIG. 3D) corresponding to frequencies with which terms in the global dictionary are found in files locally stored at a collection of machines 1002 in distributed system (e.g., the endpoint machines at nodes in one or more local communication orbits), an external machine 116 (e.g., administrator machine 116, or a set of machines that together perform the functions herein described as being performed by the external machine) sends requests, sometimes herein called sampling requests, 1101 to each endpoint machine of the collection of machines 1002. In response to the sampling requests, the endpoint machines send 1103 responses that provide the information required for the external machine 116 to generate and update the global dictionary. For example, in some embodiments, the responses include samples of content from locally stored files. In some embodiments, the responses include counts of locally stored files that include respective terms. Using the information received in the sampling responses, the external machine 116 generates and/or updates a global dictionary, and then distributes 1105 (sometimes described as publishing) the global dictionary to endpoint machines 112 in the collection of machines 1002. In response, each endpoint machine receives and locally stores 1107 the global dictionary, so as to be able to use the global IDF values in the global dictionary. In some embodiments, the IDF values in the global dictionary generated in this manner are estimated IDF values, as the IDF values are based on less than complete knowledge of the contents of all the files locally stored at all the machines 112 in the collection of machines 1002.

At a first time, the external machine 116, which need not be the same external machine as the external machine that issued the sampling requests 110 and published 1105 the global dictionary, authors a similarity search query (1104), and forwards the similarity search query to a server of the network 118 (e.g., server 108 of FIG. 1), which in turn forwards the similarity query (1106) to N endpoint machines in the collection of machines 1002, where N is an integer greater than 0 (e.g., in some embodiments, N is an integer greater than 2, or 5, or 10). In some embodiments, external machine 116 includes in the similarity search query one or more portions of the published global dictionary 1105, e.g., portions specifying the global IDF values for one or more (e.g., all) of the terms in the similarity search query. The similarity search query is a request to identify files similar to a target file, such as a file of interest that is stored in one of the endpoint machines, or a file of interest stored at the external machine. As discussed above with reference to FIG. 3B, in some embodiments the similarity search query (e.g., similarity search query 320) includes entries 324, each of which identifies a term in the target file, and a term frequency (TF) value, term frequency-inverse document frequency (TFIDF) value, or TF and IDF values for that term, where the TF component of the latter value corresponds to the number of occurrences of the term in the target file (a/k/a the target document). Furthermore, as shown in FIG. 2, the similarity search query (e.g., Rule M 204-M) optionally includes filter 250, which limits the scope of the similarity search performed in response to the similarity search query to files that satisfy the criteria specified by the filter 250.

At each of the N endpoint machines, the similarity search query is received (1108). For example, referring to FIGS. 1A and 1B, in some embodiments each of the N endpoint machines receives the similarity search query through a linear communication orbit, wherein the similarity search query is propagated from a respective server to the respective machine though one or more upstream machines (i.e., upstream of the respective machine), along the linear communication orbit. As described elsewhere in this document, the similarity search query includes token identifiers (e.g., hashed token values) corresponding to tokens (sometimes herein called terms) in a target document.

In response to receiving (1108), the similarity search query, each respective endpoint machine of the N endpoint machines identifies locally stored at the respective machine that meet predefined similarity criteria with respect to the target document, and as part of that process, generates a similarity score for each identified file. More particularly, each respective endpoint machine evaluates the similarity search query 1110. Since evaluating the similarity search query with respect to thousands of locally stored files will typically take multiple seconds to complete, even when file vectors for the locally stored files have been computed by the respective endpoint machine prior to receiving the similarity search query, and will use a significant amount of computational resources unless the processing of the similarity search query is managed so as to limit its impact on other processes being executed by the endpoint machine, in some embodiments, and typically, the received similarity search query is evaluated in a background process, for example using background processing module 750 (FIG. 7) and similarity search module (client) 760, which are configured to prevent the evaluation of a similarity search query from having a significant impact on other processes being executed by the endpoint machine.

In some embodiments, in response to a received similarity search query, the respective endpoint machine computes a similarity score for each locally stored file that satisfies the filter 250, if any, specified by, included with, or otherwise associated with the similarity search query, and stores the resulting similarity score in local storage 1112 of the respective endpoint machine. In some embodiments, the respective endpoint machine also compares the computed similarity score for each locally stored file, compares it with one or more similarity threshold values, and stores the results of the one or more comparisons in local storage 112. For example, if the similarity threshold values include similarity threshold values of 70%, 80% and 90% (i.e., 0.7, 0.8 and 0.9), pass/fail values are stored for each evaluated file with respect to those similarity threshold values.

In some embodiments, the similarity score for a respective file and a target file, represented by the received similarity search query, is a cosine similarity score, which is computed by computing a dot product, sometimes called cosine similarity, of the TFIDF values of the terms in the respective file with file vector, as represented by the file vector for that file, and the TFIDF values for terms in the target file, as represented by TFIDF values for the terms identified by the received similarity search query.

As noted above, in some embodiments the file vector and similarity search query already include TFIDF values for the terms in the respective file and target file. However, in some other embodiments, the file vector and similarity search query include TF (term frequency) values for the terms in the respective file and target file, and those TF values need to be combined by the endpoint machine with corresponding IDF values to generate the corresponding TFIDF values. For example, $$TFIDF(t,d,D) = TF(t,d) \times IDF(t,D)$$

where TF(t, d) is the term frequency of term t in document d; × represents the scalar multiplication operation; and IDF(t, D) is the inverse document frequency of term t in corpus D (i.e., in a corpus of documents identified by "D"). In these embodiments, the IDF values are obtained from a local or global dictionary stored at the endpoint machine.

In some embodiments, the cosine similarity between a query q and a document d is computed as follows:

$$\cos(q, d, D) = \frac{\sum_{t \in q} TFIDF(t, q, D) \times TFIDF(t, d, D)}{\sqrt{\sum_{t \in q} TFIDF(t, q, D)^2} \times \sqrt{\sum_{t \in q} TFIDF(t, d, D)^2}} \quad (1)$$

where TFIDF(t, q, D) is the TFIDF for term t in query q with respect to corpus D, TFIDF(t, d, D) is the TFIDF for term t in document d with respect to corpus D, and all the summations denoted in Equation 1 are summed for all terms in the similarity search query q; terms in document d not found in the similarity search query q are ignored and not included in the computation of the cosine similarity, cos(q, d, D).

Subsequent to receiving (1108) the first query, the respective machine generates a first report (sometimes herein called a first similarity search report) that includes, for the received similarity search query, a count of files at the respective machine that meet predefined similarity criteria (e.g., having similarity scores greater than one or more similarity threshold values) with respect to the target file and/or file identifying information for a set of files that meet the predefined similarity criteria with respect to the target file. It is noted that the files that meet the predefined similarity criteria include files having content that is not identical to content of the target file. Examples of the information included in the first report are shown in FIGS. 6D and 6E. In some embodiments, the first similarity search report is stored in local storage of the respective machine, and is transmitted to a requesting machine (e.g., a server 108/110 or external machine 116) in response to a second query is received at a second time, subsequent to the first time.

At the second time, subsequent to the first time, a requesting machine, such as a server 108/110 of the network generates and/or forwards a second query 1115 to the collection of endpoint machines, and each of the N endpoint machines receives the second query. In some embodiments, the second query, which is for collecting similarity search results, is a request generated by the external machine 116 which generated the similarity search query or initiated sending the similarity search query to the endpoint machines in the collection of machines 1002. In some embodiments, the second query includes instructions for each of the endpoint machines to send the aforementioned first similarity search report to the similarity reports in response to the previously sent similarity query.

In response to receiving the second query (1116), each of the N endpoint machines sends 1118 the first similarity search report (e.g., containing search results such as those shown in FIG. 6D and/or FIG. 6E) to the server 108/110. In some embodiments, the first report is sent by the endpoint machines through a linear communication orbit to the server via an end machine (e.g., machine 102f, FIG. 1B) of the linear communication orbit (e.g., linear communication orbit 106a, FIG. 1B). In some embodiments, the N endpoint machines are all located on the same linear communication orbit, while in other embodiments each of the N endpoint machines is located on a respective linear communication orbit of a plurality of linear communication orbits.

A respective server (e.g., server 108/110) of the network receives 1120 from each of the N respective endpoint machines a respective first report, including a count of files at the respective machine that meet the predefined similarity criteria with respect to the target document and/or file identifying information for a set of files that meet the predefined similarity criteria with respect to the target document. Furthermore, the server, or the external machine, produces a merged report presenting information with respect to files at a set of machines, including the N respective machines, that meet the predefined similarity criteria with respect to the target document. For example, in some embodiments, the server aggregates the first search reports from the N endpoint machines, and subsequently forwards the aggregated first search report (1120) to the external machine. In some embodiments, external machine then displays or otherwise presents the aggregated first search report, or portions thereof, to a human analyst for review.

In some embodiments, at a respective endpoint machine of the N respective endpoint machines, after sending the first report, receives, from an external machine (e.g., administrator machine 116), external to the linear communication orbit, an instruction packet 1124 via the linear communication orbit, where the instruction packet has been propagated 1126 to the respective machine through the one or more upstream machines along the linear communication orbit, and the instruction packet includes an instruction for establishing a direct duplex connection between the respective machine and the external machine.

In response to receiving the instruction packet through the linear communication orbit, the respective endpoint machine sends an outbound connection request to the external machine to establish the direct duplex connection 1128 between the respective machine and the external machine in accordance with a respective network connection protocol, and sends to the external machine, via the direct duplex connection, a second report 1130 with additional information, not included in the first report, with respect to one or more of the files identified as meeting the predefined similarity criteria with respect to the target file. The external machine receives the second report 1132, and presents corresponding information to the human analyst. In some embodiments, the respective endpoint machine of the N respective endpoint machines furthermore receives another query (e.g., a third query) through the direct duplex connection from the external machine, wherein the third query includes one or more requests for snippets of information from a respective file, stored at the respective machine, identified as meeting the predefined similarity criteria with respect to the target document. In response to receiving the third query, the respective endpoint machine sends to the external machine via the duplex direct connection a further report (e.g., a third report) including one or more snippets corresponding to file content in the respective file that includes text corresponding to one or more tokens specified by the third query.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

It will be understood that, although the terms "first," "second," etc. may be used herein to describe various elements, these elements should not be limited by these terms. These terms are only used to distinguish one element from another. For example, a first widget could be termed a second widget, and, similarly, a second widget could be termed a first widget, without changing the meaning of the description, so long as all occurrences of the "first widget" are renamed consistently and all occurrences of the "second widget" are renamed consistently. The first widget and the second widget are both widgets, but they are not the same widget.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "upon a determination that" or "in response to determining" or "in accordance with a determination" or "upon detecting" or "in response to detecting" that the stated condition precedent is true, depending on the context.

What is claimed is:

1. A method of monitoring a network comprising a collection of machines that forms a linear communication orbit, the method comprising:
at a respective machine in the collection of machines: at each of N respective machines in the collection of machines that comprise nodes in a linear communication orbit, where N is an integer greater than 2:
receiving a similarity search query through the linear communication orbit, wherein the similarity search query has been propagated from a respective server to the respective machine though one or more upstream machines along the linear communication orbit, and wherein the similarity search query includes token identifiers corresponding to tokens in a target document; wherein each of the N respective machines receives the similarity search query;
in response to receiving the similarity search query: identifying files stored at the respective machine that meet predefined similarity criteria with respect to the target document, and for each identified file generating a similarity score;
subsequent to receiving the similarity search query:
generating a first report that includes a count of files stored at the respective machine that meet the predefined similarity criteria with respect to the target document identifying information for a set of files that meet the predefined similarity criteria with respect to the target document; wherein the files that meet the predefined similarity criteria include files having content that is not identical to content of the target document;
sending the first report through the linear communication orbit to the respective server via an end machine of the linear communication orbit;
at the respective server:
receiving from each of the N respective machines a respective first report, including a count of files at the respective machine that meet the predefined similarity criteria with respect to the target document identifying information for a set of files that meet the predefined similarity criteria with respect to the target document;
producing a merged report presenting information with respect to files at a set of machines, including the N respective machines, that meet the predefined similarity criteria with respect to the target document.

2. The method of claim 1, further comprising:
at a respective machine of the N respective machines:
after sending the first report, receiving, from an external machine, external to the linear communication orbit, an instruction packet via the linear communication orbit, wherein the instruction packet has been propagated to the respective machine through the one or more upstream machines along the linear communication orbit, and wherein the instruction packet includes an instruction for establishing a direct duplex connection between the respective machine and the external machine;
in response to receiving the instruction packet through the linear communication orbit, sending an outbound connection request to the external machine to establish the direct duplex connection between the respective machine and the external machine in accordance with a respective network connection protocol; and
sending to the external machine, via the direct duplex connection, a second report with additional information, not included in the first report, with respect to one or more of the files identified as meeting the predefined similarity criteria with respect to the target document.

3. The method of claim 2, including,
at the respective machine of the N respective machines:
receiving a second query through the direct duplex connection from the external machine, wherein the second query comprises one or more requests for snippets of information from a respective file, stored at the respective machine, identified as meeting the predefined similarity criteria with respect to the target document;
in response to receiving the second query, sending to the external machine via the duplex direct connection a third report including one or more snippets corresponding to file content in the respective file that includes text corresponding to one or more tokens specified by the second query.

4. The method of claim 2, wherein the external machine is the respective server.

5. The method of claim 2, wherein the direct duplex connection comprises an encrypted communication connection in which information sent by the respective machine to the external machine is encrypted.

6. The method of claim 1, wherein the similarity search query includes a set of token identifiers identifying fifty (50) or more tokens in the target document, the fifty or more tokens selected in accordance with term-frequency inverse document frequency metrics for tokens in the target document.

7. The method of claim 1, wherein the predefined similarity criteria include a threshold score for a similarity metric that quantifies similarity of respective files to the target document.

8. The method of claim 1, including, at each of N respective machines in the collection of machines:
receiving and locally storing inverse-document frequency (IDF) values corresponding to a set of tokens, wherein the set of tokens includes a set of target tokens, comprising the tokens in the target document corresponding to the token identifiers in the similarity search query; and in response to receiving the similarity search query:

for each respective file of a plurality of files stored at the respective machine, computing a similarity metric in accordance with the IDF values corresponding to target tokens in the set of target tokens, term frequencies of the target tokens in the respective file, and term frequencies of the target tokens in the target document.

9. The method of claim 8, wherein the similarity search query includes, for each token identifier in the similarity search query, a term frequency (TF) value corresponding to a frequency of a corresponding token in the target document.

10. The method of claim 1, wherein the similarity search query includes, for each token identifier in the similarity search query, a term frequency (TF) value corresponding to a frequency of a corresponding token in the target document or a term frequency inverse document frequency (TFIDF) value for the corresponding token in the target document.

11. The method of claim 1, including, maintaining, at each respective machine of the N respective machines, an inverse document index, wherein the inverse document index maps tokens in locally stored files, locally stored at the respective machine, to files that include content corresponding to the tokens mapped by the inverse document index.

12. The method of claim 11, wherein the inverse document index is indexed by hashed token identifiers, hashed using a predefined one-way hash function, and the similarity search query includes hashed token identifiers corresponding to tokens in the target document.

13. The method of claim 1, including, at each respective machine of the N respective machines: storing the first report in a local database of the respective machine prior to receiving the a request from the respective server to send the first report.

14. A distributed system, comprising:
a respective server; and
N respective machines in a collection of machines that comprise nodes in a linear communication orbit, where N is an integer greater than 2, wherein each respective machine of the N respective machines is configured to perform operations including:
receiving a similarity search query through the linear communication orbit, wherein the similarity search query has been propagated from the respective server to the respective machine though one or more upstream machines along the linear communication orbit, and wherein the similarity search query includes token identifiers corresponding to tokens in a target document; wherein each of the N respective machines receives the similarity search query;
in response to receiving the similarity search query:
identifying files stored at the respective machine that meet predefined similarity criteria with respect to the target document, and for each identified file generating a similarity score;
subsequent to receiving the similarity search query:
generating a first report identifying a count of files stored at the respective machine that meet the predefined similarity criteria with respect to the target document and/or file identifying information for a set of files that meet the predefined similarity criteria with respect to the target document; wherein the files that meet the predefined similarity criteria include files having content that is not identical to content of the target document;
sending the first report through the linear communication orbit to the respective server via an end machine of the linear communication orbit;
wherein the respective server is configured to perform operations including:
receiving from each of the N respective machines a respective first report, identifying a count of files at the respective machine that meet the predefined similarity criteria with respect to the target document and/or file identifying information for a set of files that meet the predefined similarity criteria with respect to the target document;
producing a merged report presenting information with respect to files at a set of machines, including the N respective machines, that meet the predefined similarity criteria with respect to the target document.

15. The distributed system of claim 14, wherein each respective machine of the N respective machines is further configured to perform operations including:
at the respective machine of the N respective machines:
after sending the first report, receiving, from an external machine, external to the linear communication orbit, an instruction packet via the linear communication orbit, wherein the instruction packet has been propagated to the respective machine through the one or more upstream machines along the linear communication orbit, and wherein the instruction packet includes an instruction for establishing a direct duplex connection between the respective machine and the external machine;
in response to receiving the instruction packet through the linear communication orbit, sending an outbound connection request to the external machine to establish the direct duplex connection between the respective machine and the external machine in accordance with a respective network connection protocol; and
sending to the external machine, via the direct duplex connection, a second report with additional information, not included in the first report, with respect to one or more of the files identified as meeting the predefined similarity criteria with respect to the target document.

16. The distributed system of claim 15, wherein each respective machine of the N respective machines is further configured to perform operations including:
at the respective machine of the N respective machines:
receiving a second query through the direct duplex connection from the external machine, wherein the second query comprises one or more requests for snippets of information from a respective file, stored at the respective machine, identified as meeting the predefined similarity criteria with respect to the target document;
in response to receiving the second query, sending to the external machine via the duplex direct connection a third report including one or more snippets corresponding to file content in the respective file that includes text corresponding to one or more tokens specified by the second query.

17. The distributed system of claim 15, wherein the direct duplex connection comprises an encrypted communication connection in which information sent by the respective machine to the external machine is encrypted.

18. The distributed system of claim 14, wherein the similarity search query includes a set of token identifiers identifying fifty (50) or more tokens in the target document, the fifty or more tokens selected in accordance with term-frequency inverse document frequency metrics for tokens in the target document.

19. The distributed system of claim 14, wherein the predefined similarity criteria include a threshold score for a similarity metric that quantifies similarity of respective files to the target document.

20. The distributed system of claim 14, wherein each respective machine of the N respective machines is further configured to perform operations including:
   receiving and locally storing inverse-document frequency (IDF) values corresponding to a set of tokens, wherein the set of tokens includes a set of target tokens, comprising the tokens in the target document corresponding to the token identifiers in the similarity search query; and
   in response to receiving the similarity search query:
      for each respective file of a plurality of files stored at the respective machine, computing a similarity metric in accordance with the IDF values corresponding to target tokens in the set of target tokens, term frequencies of the target tokens in the respective file, and term frequencies of the target tokens in the target document.

\* \* \* \* \*

UNITED STATES PATENT AND TRADEMARK OFFICE
CERTIFICATE OF CORRECTION

| | |
|---|---|
| PATENT NO. | : 10,929,345 B2 |
| APPLICATION NO. | : 16/532391 |
| DATED | : February 23, 2021 |
| INVENTOR(S) | : Stoddard et al. |

It is certified that error appears in the above-identified patent and that said Letters Patent is hereby corrected as shown below:

On the Title Page

Item (54), Line 1, please delete "METHOD OF PERFORMING" and insert --METHOD FOR PERFORMING--.

Signed and Sealed this
Twenty-seventh Day of April, 2021

Drew Hirshfeld
*Performing the Functions and Duties of the
Under Secretary of Commerce for Intellectual Property and
Director of the United States Patent and Trademark Office*